United States Patent
Kweon et al.

(10) Patent No.: US 9,648,649 B2
(45) Date of Patent: May 9, 2017

(54) METHOD AND APPARATUS FOR OPTIMIZING DATA ROUTE IN MOBILE COMMUNICATION SYSTEM

(71) Applicant: Samsung Electronics Co., Ltd., Gyeonggi-do (KR)

(72) Inventors: Kisuk Kweon, Gyeonggi-do (KR); Alper Yegin, Istanbul (TR); Jungshin Park, Gyeonggi-do (KR); Jinsung Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 79 days.

(21) Appl. No.: 14/322,876

(22) Filed: Jul. 2, 2014

(65) Prior Publication Data
US 2015/0009811 A1   Jan. 8, 2015

(30) Foreign Application Priority Data

Jul. 2, 2013 (KR) .......................... 10-2013-0077061

(51) Int. Cl.
*H04W 76/02* (2009.01)
*H04W 40/02* (2009.01)
(Continued)

(52) U.S. Cl.
CPC ......... *H04W 76/021* (2013.01); *H04W 40/02* (2013.01); *H04W 76/022* (2013.01);
(Continued)

(58) Field of Classification Search
CPC . H04W 40/02; H04W 76/021; H04W 76/022; H04W 40/20; H04W 12/06; H04L 63/0892; H04L 61/1511; H04L 45/306
See application file for complete search history.

(56) References Cited

U.S. PATENT DOCUMENTS 7,840,217 B2   11/2010   Patel et al.
8,068,840 B2   11/2011   Patel et al.
(Continued)

OTHER PUBLICATIONS

International Search Report dated Oct. 17, 2014 in connection with International Application No. PCT/KR2014/005857; 3 pages.
(Continued)

*Primary Examiner* — Jae Y Lee

(57) ABSTRACT

Disclosed are a method and an apparatus for optimizing a data route in a mobile communication system. A method of setting an internet protocol (IP) session in a mobile communication system, by a Mobile Station (MS) includes querying and obtaining an IP address of a corresponding node corresponding to a predetermined application and an IP address of a corresponding gateway corresponding to the corresponding node. The method also includes accessing the corresponding gateway based on the IP address of the corresponding gateway. The method further includes receiving a corresponding gateway allocation IP address from the corresponding gateway and forming a tunnel between the MS and the corresponding gateway. The method includes setting an IP session between the MS and the corresponding node based on the IP address of the corresponding node and the corresponding gateway allocation IP address.

29 Claims, 20 Drawing Sheets

(51) Int. Cl.
 H04W 40/20 (2009.01)
 H04L 12/725 (2013.01)
 H04W 12/06 (2009.01)
 H04L 29/12 (2006.01)
 H04L 29/06 (2006.01)

(52) U.S. Cl.
 CPC ......... *H04L 45/306* (2013.01); *H04L 61/1511* (2013.01); *H04L 63/0892* (2013.01); *H04W 12/06* (2013.01); *H04W 40/20* (2013.01)

(56) References Cited

U.S. PATENT DOCUMENTS

| | | | |
|---|---|---|---|
| 8,144,593 | B2 | 3/2012 | Narayanan et al. |
| 8,320,309 | B2 | 11/2012 | Nikander et al. |
| 8,477,685 | B2 | 7/2013 | Yan |
| 2003/0093553 | A1 | 5/2003 | Le et al. |
| 2006/0268817 | A1 | 11/2006 | Yokota et al. |
| 2009/0310495 | A1* | 12/2009 | Seta ................. H04W 8/082 370/252 |
| 2010/0097992 | A1 | 4/2010 | Velev et al. |
| 2010/0299446 | A1* | 11/2010 | Huang ............... H04L 63/0227 709/231 |
| 2011/0026453 | A1 | 2/2011 | Yan |
| 2011/0299477 | A1 | 12/2011 | Nikander et al. |
| 2012/0044949 | A1 | 2/2012 | Velev et al. |
| 2014/0153489 | A1* | 6/2014 | Perras ................. H04W 60/00 370/328 |
| 2014/0341109 | A1* | 11/2014 | Cartmell ............. H04L 45/308 370/328 |

OTHER PUBLICATIONS

Yegin, et al., "Corresponding Network Homing," draft-yegin-dmm-cnet-homing-01, Internet Engineering Task Force, IETF, XP015095816, Samsung, Oct. 21, 2013, 14 pages.

Soliman, et al., "Mobile IPv6 Support for Dual Stack Hosts and Routers," RFC 5555, Internet Engineering Task Force, IETF, XP015065596, Elevate Technologies, Jun. 2009, 41 pages.

Giaretta, et al., "Mobile IPv6 Bootstrapping in Split Scenario," RFC 5026, Internet Engineering Task Force, IETF, XP015055098, Azaire Networks, Oct. 2007, 28 pages.

Foreign Communication From a Related Counterpart Application, European Application No. 14820130.4-1505, Extended European Search Report dated Jan. 20, 2017, 10 pages.

\* cited by examiner

METHOD AND APPARATUS FOR OPTIMIZING DATA ROUTE IN MOBILE COMMUNICATION SYSTEM

CROSS-REFERENCE TO RELATED APPLICATION(S) AND CLAIM OF PRIORITY

The present application is related to and claims priority under 35 U.S.C. §119 to an application filed in the Korean Intellectual Property Office on Jul. 2, 2013 and assigned Serial No. 10-2013-0077061, the contents of which are incorporated herein by reference.

TECHNICAL FIELD

The present disclosure relates generally to a mobile communication system, and more particularly to a method and an apparatus for optimizing a data route between a corresponding node and a terminal in a mobile communication system.

BACKGROUND

Since a Mobile Station (MS) has mobility in a mobile communication system, the network can always grasp a position of the terminal and efficiently transmit seamless data received from an external network to the terminal. To this end, the MS can conduct a handover when moving from one base station to another base station. If the terminal moves farther away to a network of another service provider, the terminal can roam onto the network. As described above, management of a location of the MS can be referred to as the mobility management.

A mobility management technique of the conventional mobile communication system can adopt a centralized scheme based on a hierarchical network structure. For example, in a Universal Mobile Telecommunication System (UTMS) network and a System Architecture Evolution (SAE) network which are 3rd Generation Partnership Project (3GPP) standards, a mobility agent for managing mobility can be located on a core network for the centralized mobility management.

The mobility agent can manage binding information of the MS and process data traffic of the terminal. A Packet Data Network (PDN) Gateway (P-GW) can correspond to a centralized mobility agent in the 3GPP SAE, and a Gateway General Packet Radio Standard (GPRS) Support Node (GGSN) can correspond to a centralized mobility agent in the UMTS network.

However, such a centralized mobility management technique can have problems.

A first problem can include inefficiency of a routing route. Both traffic transmitted to the terminal and traffic transmitted from the MS can pass through the centralized agent. If all traffic should pass through the centralized agent even though the MS and a Corresponding Node (CN) are located geographically close to each other, data transmission/reception can be delayed.

A second problem can include an error of the centralized agent (such as a single point of failure). As described above, in the centralized mobility management, all traffic can pass through the centralized agent. Accordingly, when the centralized agent malfunctions, communication of the overall network can be paralyzed.

A third problem can include traffic centralization of the core network. Since traffic of all MSs can concentrate on the core network, a scalability problem of the network and equipment can be generated due to traffic overloads. As a result, this can cause as burden that a communication service provider should increase networks and equipment of the core network. Particularly, as communication technologies are developed, a burden of the core network can become more serious because of the development of radio access technologies.

SUMMARY

To address the above-discussed deficiencies, it is a primary object to define a corresponding gateway located geographically close to a corresponding node and to provide a method and an apparatus for managing mobility of an MS through the corresponding gateway.

In a first example, a method of setting an Internet Protocol (IP) session in a mobile communication system by a Mobile Station (MS) is provided. The method includes querying and obtaining an IP address of a corresponding node corresponding to a predetermined application and an IP address of a corresponding gateway corresponding to the corresponding node. The method also includes accessing the corresponding gateway based on the IP address of the corresponding gateway. The method further includes receiving a corresponding gateway allocation IP address from the corresponding gateway and forming a tunnel between the MS and the corresponding gateway. The method includes setting an IP session between the Ms and the corresponding node based on the IP address of the corresponding node and the corresponding gateway allocation IP address.

In a second example, a method of setting a data route in a mobile communication system, by a corresponding gateway is provided. The method includes receiving a binding update message from a predetermined Mobile Station (MS). The method also includes allocating a corresponding gateway allocation Internet Protocol (IP) address to the MS. The method further includes transmitting a binding Ack message including information on the corresponding gateway allocation IP address to the MS and forming a tunnel between the MS and the corresponding gateway, wherein the corresponding gateway is located geographically close to a corresponding node corresponding to a predetermined application.

In a third example, a method of setting a data route in a mobile communication system is provided. The method includes querying and obtaining an Internet Protocol (IP) address of a corresponding node corresponding to a predetermined application and an IP address of a corresponding gateway corresponding to the corresponding node, by a Mobile Station (MS). The method also includes transmitting a binding update message to the corresponding gateway based on the IP address of the corresponding gateway, by the MS. The method further includes allocating a corresponding gateway allocation IP address to the MS, by the corresponding gateway. The method includes transmitting a binding Ack message including information on the corresponding gateway allocation IP address to the MS and forming a tunnel between the MS and the corresponding gateway, by the corresponding gateway, wherein the corresponding gateway is located geographically close to a corresponding node corresponding to a predetermined application.

In a fourth example, a Mobile Station (MS) setting an Internet Protocol (IP) session in a mobile communication system is provided. The MS includes a transceiver configured to transmit/receive signals to/from predetermined nodes located in the mobile communication system. The MS also includes a controller configured to query and obtain an IP address of a corresponding node corresponding to a predetermined application and an IP address of a corresponding gateway corresponding to the corresponding node, access the corresponding gateway based on the IP address of the corresponding gateway, receive a corresponding gateway allocation IP address from the corresponding gateway and form a tunnel between the MS and the corresponding gateway, and set an IP session between the Ms and the corresponding node based on the IP address of the corresponding node and the corresponding gateway allocation IP address.

In a fifth example, a corresponding gateway setting a data route in a mobile communication system is provided. The corresponding gateway includes a transceiver configured to transmit/receive signals to/from predetermined nodes located in the mobile communication system. The corresponding gateway also includes a controller configured to make a control to allocate a corresponding gateway allocation Internet Protocol (IP) address to a predetermined Mobile Station (MS) when receiving a binding update message from the MS, transmit a binding Ack message including information on the corresponding gateway allocation IP address to the MS, and form a tunnel between the MS and the corresponding gateway, wherein the corresponding gateway is located geographically close to a corresponding node corresponding to a predetermined application.

In a sixth example, a tunneling method of a local gateway in a mobile communication system is provided. The tunneling method includes receiving a lookup message for obtaining an Internet Protocol (IP) address of a corresponding node corresponding to a predetermined application from a Mobile Station (MS). The tunneling method also includes querying and obtaining an IP address of the corresponding node and an IP address of corresponding gateway corresponding to the corresponding node in response to the reception of the lookup message. The tunneling method further includes making a request for a binding update to the corresponding gateway based on IP addresses of the local gateway and the corresponding gateway. The tunneling method includes receiving a corresponding gateway allocation IP address from the corresponding gateway in response to the request for the binding update and forming a tunnel between the local gateway and the corresponding gateway.

In a seventh example, a local gateway performing tunneling in a mobile communication system is provided. The local gateway includes a transceiver configured to transmit/receive signals to/from predetermined nodes located in the mobile communication system. The local gateway also includes a controller configured to, when receiving a lookup message for obtaining an IP address of a corresponding node corresponding to a predetermined application from a Mobile Station (MS), query and obtain IP addresses of the corresponding node and a corresponding gateway corresponding to the corresponding node in response to the reception of the lookup message, make a request for a binding update to the corresponding gateway based on IP addresses of the local gateway and the corresponding gateway, and receive a corresponding gateway allocation IP address from the corresponding gateway in response to the request for the binding update to form a tunnel between the local gateway and the corresponding gateway.

The present disclosure suggests a Corresponding Gate-Way (CGW) to solve a problem in that an optimization of a data route is difficult since data between an MS and a Corresponding Node (CN) is transmitted via a core anchor in a centralized MS mobility management scheme. The CGW can perform MS mobility management performed by the core anchor. That is, according to embodiments of the present disclosure, all traffic between the CN and the MS should pass through the CGW. Accordingly, the MS and the CN can communicate through an optimal route, thereby reducing a data transmission delay. Further, traffic heading for a particular site does not pass through the core anchor, so that scalability of the core anchor can be reduced.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
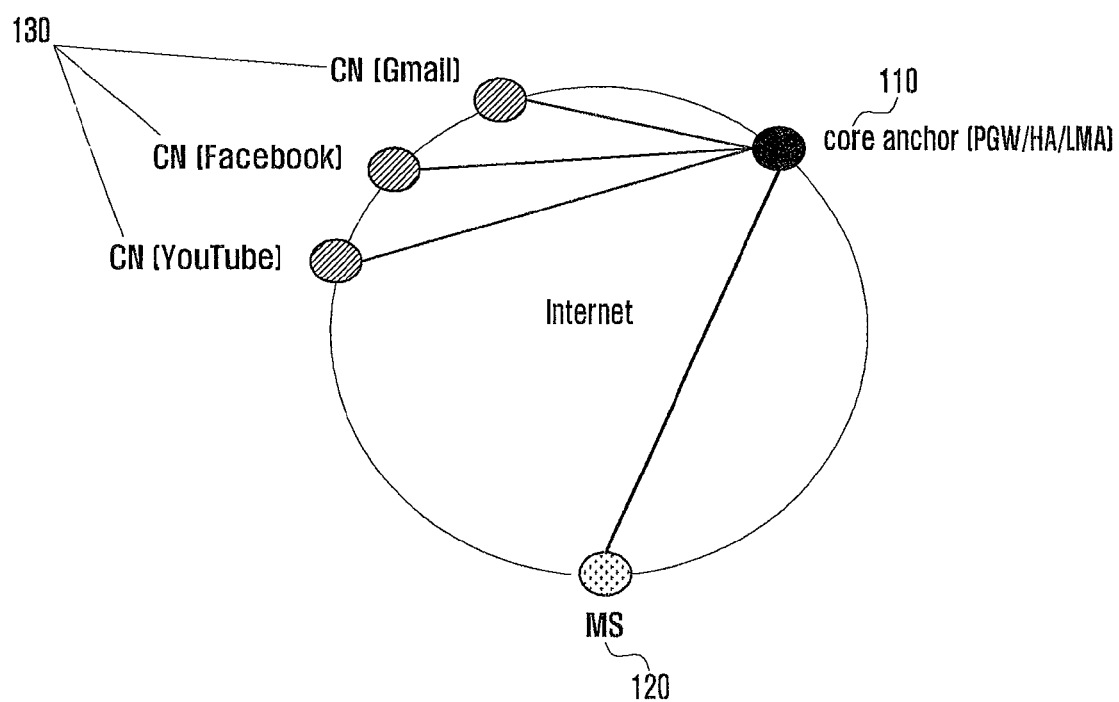
FIG. 1 illustrates an example centralized mobility management technique according to this disclosure.

FIGS. 1 through 19, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system. Hereinafter, exemplary embodiments of the present disclosure will be described with reference to the accompanying drawings. It is noted that, where possible, the same reference numerals are designated to the same components in the accompanying drawings. Further, a detailed description of a known function and configuration which may make the subject matter of the present disclosure unclear will be omitted.

FIG. 1 illustrates an example centralized mobility management technique according to this disclosure.

A core anchor 110 can receive traffic to be transmitted to a Mobile Station (MS) 120 from a corresponding node 130 and transmit the traffic to the MS 120. Further, the core anchor 110 can manage mobility of the MS 120 and binding information of the MS. The core anchor 110 can have different names according to the type of mobile communication system, for example, a Packet Data Network Gateway (PGW) in the 3GPP LTE standard.

The Corresponding Node (CN) 130 can refer to a counterpart node from/to which the MS 120 transmits/receives packets or traffic in a mobile communication system. In an embodiment of the present disclosure, the CN 130 can correspond to at least one server which provides a particular service. For example, each of servers which provide services such as Gmail, Facebook, and Youtube can correspond to one CN.

Meanwhile, a set of a plurality of CNs which provide services having the same attribute can be referred to as a Packet Data Network (PDN). For example, a set of a plurality of CNs which provide an Internet service can be referred to as an Internet PDN.

As illustrated in FIG. 1, in the centralized mobility management technique, all traffic transmitted from the MS 120 can be transmitted to the CN 130 via the core anchor 110. Similarly, all traffic transmitted to the MS 120 from the CN 130 also can pass through the core anchor 110. Accordingly, the aforementioned problem such as the inefficiency of the routing route can occur.

Figure 2:
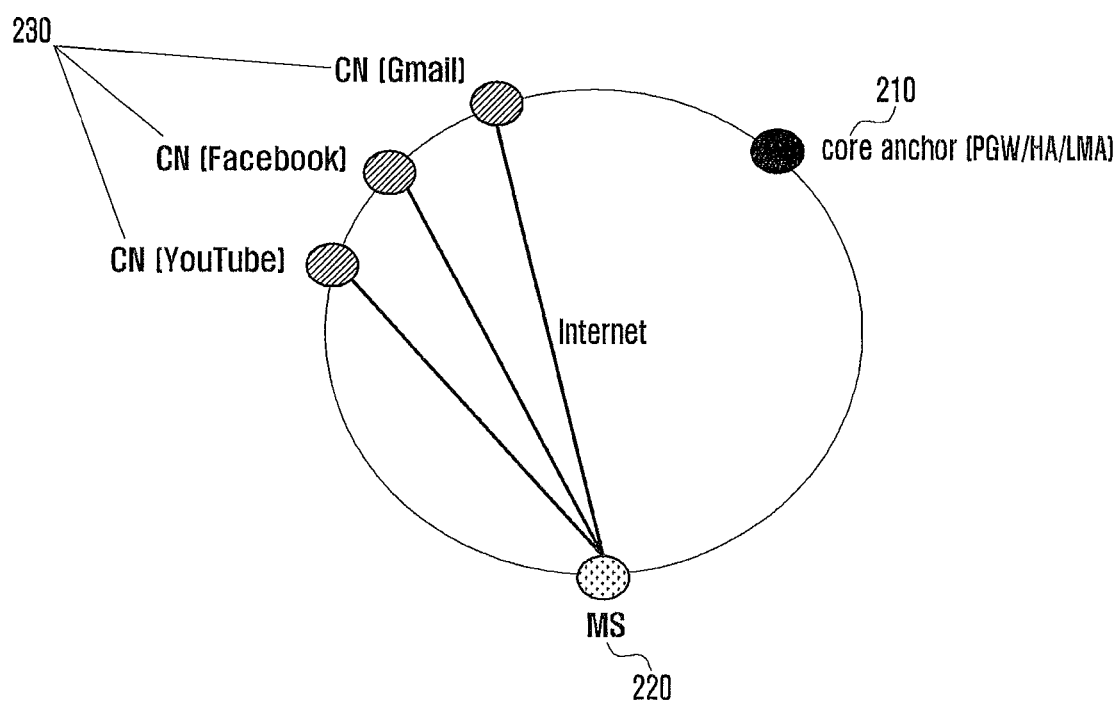
FIG. 2 illustrates an example traffic transmission route based on a data route optimizing method according to this disclosure.

FIG. 2 illustrates an example traffic transmission route based on a data route optimizing method according to this disclosure.

As illustrated in FIG. 2, in an embodiment of the present disclosure, traffic transmission between an MS 220 and a CN 230 can be made directly between the MS 220 and the CN 230 without passing through the core anchor 210.

In order to implement the direct transmission, a Corresponding Gateway (CGW) for managing mobility of the MS can be introduced. The CGW is illustrated in FIG. 3, and a function of the CGW is described herein.

The CGW can be a mobility agent which manages the mobility of the MS 220 and can be located geographically close to the CN 230 or a corresponding network. The geographically close location can mean that the CGW is located within a preset distance from the corresponding network or the CN. The preset distance does not have to be limited to a particular distance.

In an embodiment, all traffic between the MS 220 and the CN 230 can pass through the CGW. In this case, the CGW can be put on an optimal route between the MS 220 and the CN 230, so that traffic transmission between the MS 220 and the CN 230 can be made through the optimal route. The feature of the traffic transmission between the MS 220 and the CN 230, which is made through the optimal route, can become clearer with reference to embodiments of the present disclosure described below.

A network structure of the mobile communication system according to the embodiment of the present disclosure in which the CGW is located will be described through FIGS. 3A and 3B.

Figure 3A:
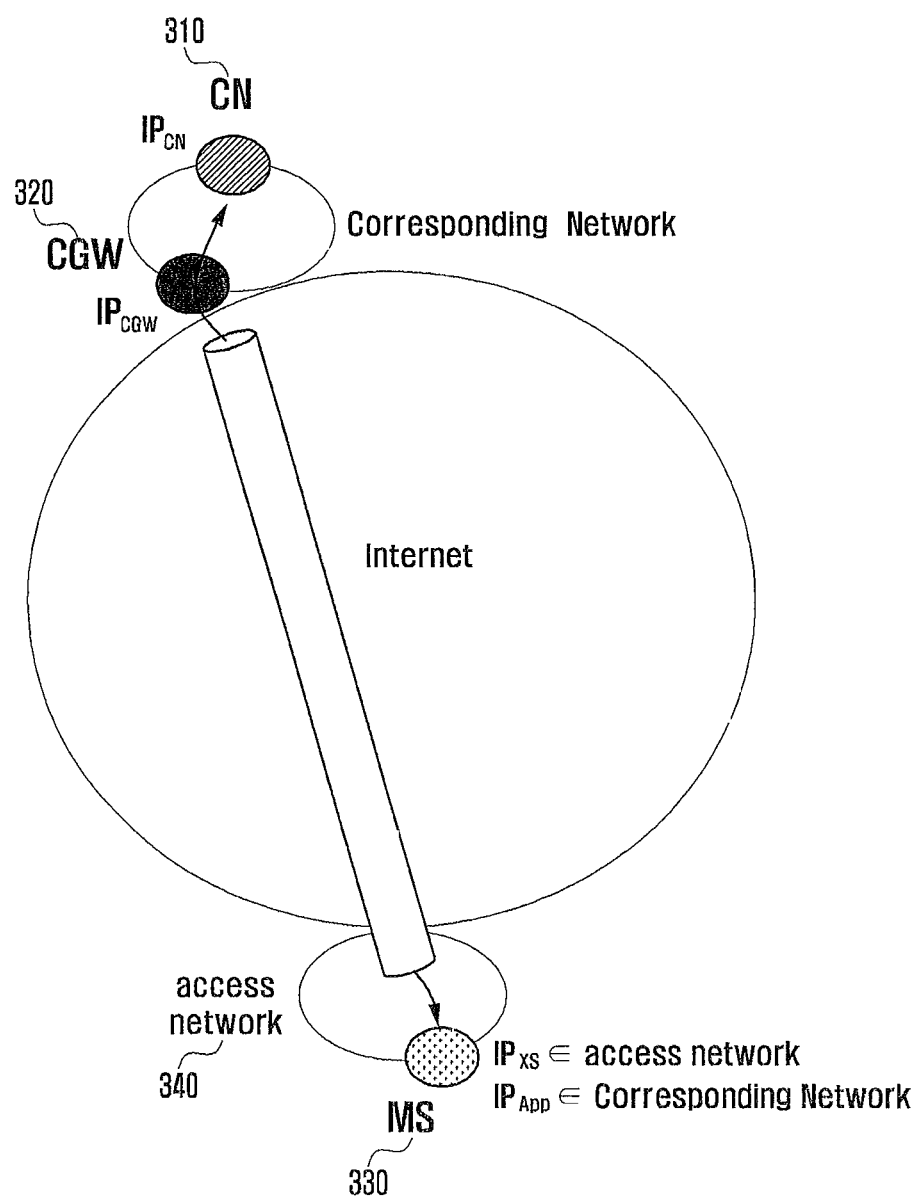
FIGS. 3A and 3B illustrate an example network structure of a mobile communication system in which a CGW is located according to this disclosure.
Figure 3B:
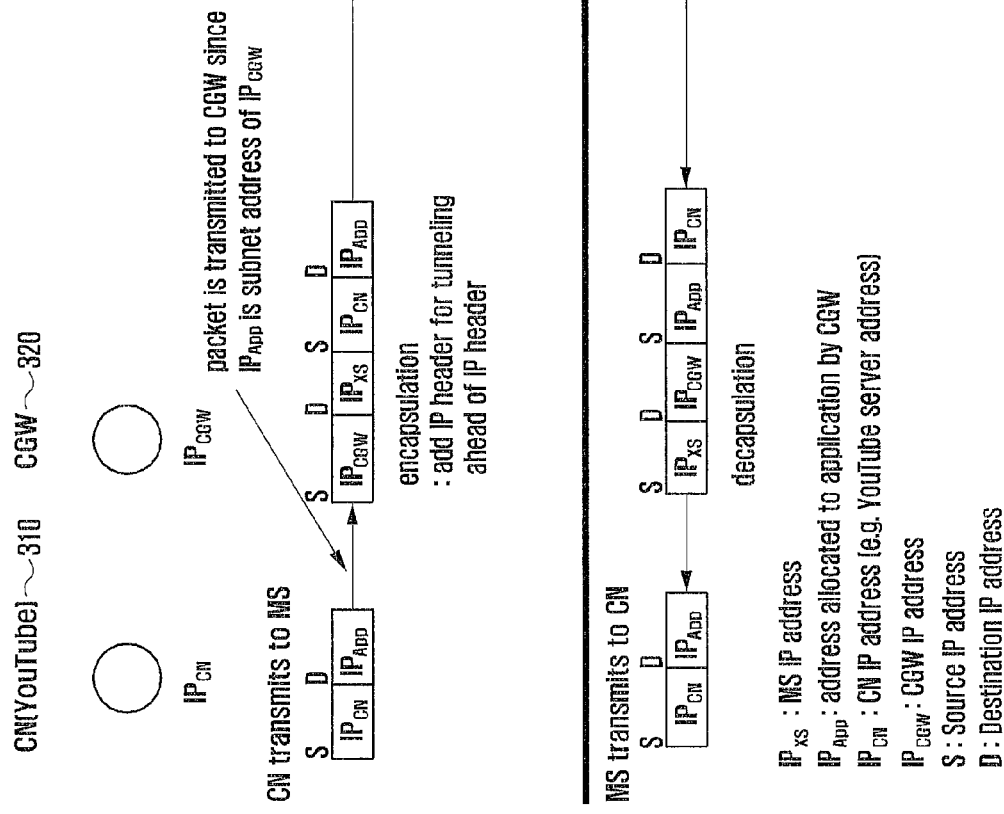
Figure 4:
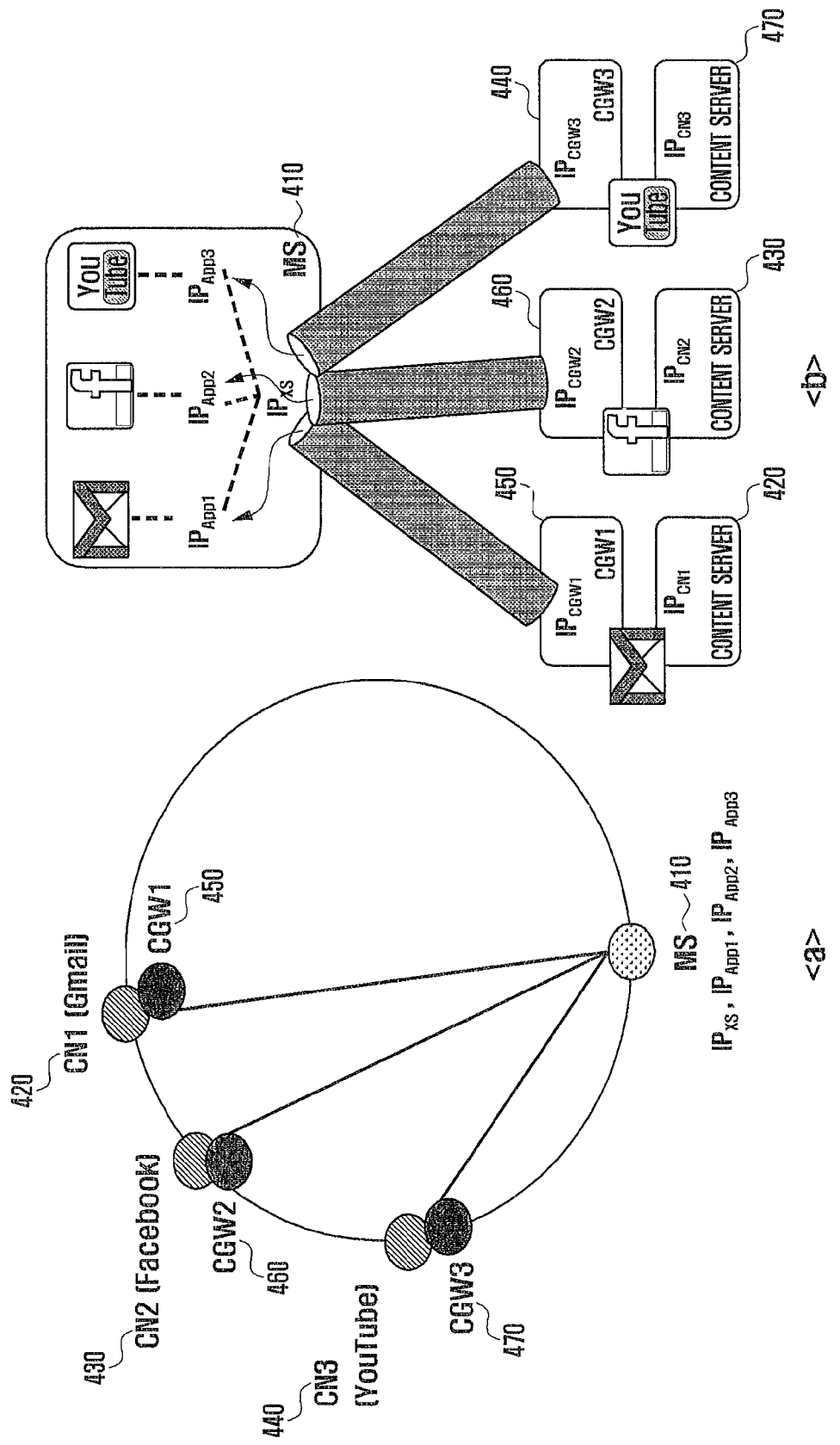
FIG. 4 is an example view describing an address allocated to an MS when the MS accesses a plurality of sites according to this disclosure.

First, FIG. 3A illustrates an example network structure of a mobile communication system according to this disclosure.

A CGW 320 can be located close to a CN 310. The close location can mean that the CGW 320 is located geographically close to the CN 310 or the CGW 320 is located logically or hierarchically adjacently to the CN 310. In embodiments of the present disclosure described below, the CN 310 and the CGW 320 can configure a corresponding network. In this case, the corresponding network can include one CN and one CGW corresponding to the CN or include a plurality of CNs and one or more CGWs corresponding to the CNs.

An access network 340 can provide a wireless interface with the MS 330. For example, the access network 340 can transmit traffic, which is transmitted to the MS 330 from the CN 310, through a wireless channel or transmit traffic, which is transmitted to the CN 310 from the MS 330, through a wireless channel. The access network 340 can have different names according to the type of wireless communication system, and any network which can allocate an IP address to the MS 330 can correspond to the access network 340 regardless of a name of a particular wireless communication system.

The MS 330 can directly transmits/receives traffic to/from the CN 310 through the CGW 320.

As illustrated in FIG. 3A, when the MS 330 accesses the access network 340, the MS 330 can receive an access network allocation address ($IP_{xs}$) from the access network. In this case, the $IP_{xs}$ can correspond to a current location of the MS 330.

Further, when the MS 330 access a particular CN 310 (or site) through the access network, the MS 330 can receive a CGW allocation' address ($IP_{app}$) from the CGW 320 located on the corresponding network including the CN 310. That is, the MS 330 can have a particular IP address for accessing a particular site. When the MS 330 accesses a plurality of sties, the MS 330 can have a plurality of $IP_{app}$s corresponding to the respective sites.

As illustrated in FIG. 3A, a tunnel can be formed between the MS 330 and the CGW 320. In this case, an application of the MS 330 can transmit packets to a network stack by using an IP address $IP_{cn}$ of the CN 310 and the IP address $IP_{app}$ received from the CGW 320 corresponding to the CN 310.

Then, the network stack of the MS can encapsulate a corresponding packet by using its own IP address $IP_{xs}$ and an IP address $IP_{CGW}$ of the CGW 320. The encapsulated packet can be transmitted to the CGW 320 of the CN 310 and the CGW 320 can decapsulate the received packet. In other words, the CGW 320 can transmit the original packet from which the addresses $IP_{CGW}$ and $IP_{xs}$ can be removed to the CN 310.

A packet from the CN can be transmitted to the MS 330, particularly the application of the MS through the tunnel between the CGW 320 and the MS 330 according to a process corresponding to the above process.

The process will be described in more detail through FIG. 3B with reference to a packet and a header structure.

Prior to the description of FIG. 3B, meanings of characters will be described below. IPxs can denote an IP address of the MS, $IP_{App}$ can denote an address which the CGW allocates to the application, $IP_{CN}$ can denote an IP address of the CN (for example, YouTube server address), $IP_{CGW}$ can denote an IP address of the CGW, S can denote a source IP address, and D can denote a destination IP address.

A process in which the CN 310 can transmit traffic to the MS 330 will be first described. The CN can configure $IP_{CN}$ as the source IP address and transmit a packet having $IP_{App}$ configured as the destination IP address to the CGW 320. In this case, since the address $IP_{App}$ is a subnet address of $IP_{CGW}$, the packet can be transmitted to the CGW 320.

Then, the CGW 320 can perform an encapsulation by adding an IP header for tunneling ahead of an IP header. In this case, the source IP address can be configured as $IP_{CGW}$ and the destination IP address can be configured as $IP_{XS}$.

Further, the encapsulated traffic can be transmitted to the MS 330, particularly a network stack of the MS 330.

Then, the network stack of the MS 330 can decapsulate the received traffic and remove the source IP address $IP_{CGW}$ and the destination IP address $IP_{xs}$ of the IP header. Further, the network stack of the MS 330 can transmit the remaining packets to the application.

Since a process in which the MS 330 can transmit traffic to the CN 310 is the same, a detailed description thereof will be omitted.

FIGS. 4A and 4B are example views describing an address allocated to the MS 330 when the MS 330 access a plurality of sites according to this disclosure.

Referring first to FIG. 4A, an MS 410 can access a first CN 420 via a first CGW 450, a second CN 430 via a second CGW 460, and a third CN 440 via a third CGW 470.

Then, the first CGW 450 can allocate a first CGW allocation address ($IP_{app1}$) to the MS 410, the second CGW 460 can allocate a second CGW allocation address ($IP_{app2}$) to the MS 410, and the third CGW 470 can allocate a third CGW allocation address ($IP_{app3}$) to the MS 410.

Accordingly, the MS 410 can have an access network allocation address ($IP_{xs}$) which the access network allocates to the MS 410 and the CGW allocation addresses $IP_{app1}$, $IP_{app2}$, and $IP_{app3}$ which the CGWs allocate to the MS, respectively. In other words, the MS 410 can have an independent CGW allocation address according to each CN (or each application).

FIG. 4B is an example view illustrating distinguished addresses allocated to the MS 410, the CGW, and the CN according to this disclosure.

Referring to FIG. 4B, the MS 410 can have the access network allocation address ($IP_{xs}$) allocated by the access network. Further, when the MS 410 accesses different CNs, the MS 410 can have the CGW allocation addresses $IP_{app1}$, $IP_{app2}$, and $IP_{app3}$ which are allocated by the CGWs corresponding to the respective CNs.

A CGW corresponding to a CN can be defined and the MS can communicate with the CN by using an address which the CGW allocates to the MS. Accordingly, the MS can transmit/receive traffic to/from the CN without passing through the core anchor.

Hereinafter, a process in which the MS communicates with the CN will be described in more detail.

Figure 5:
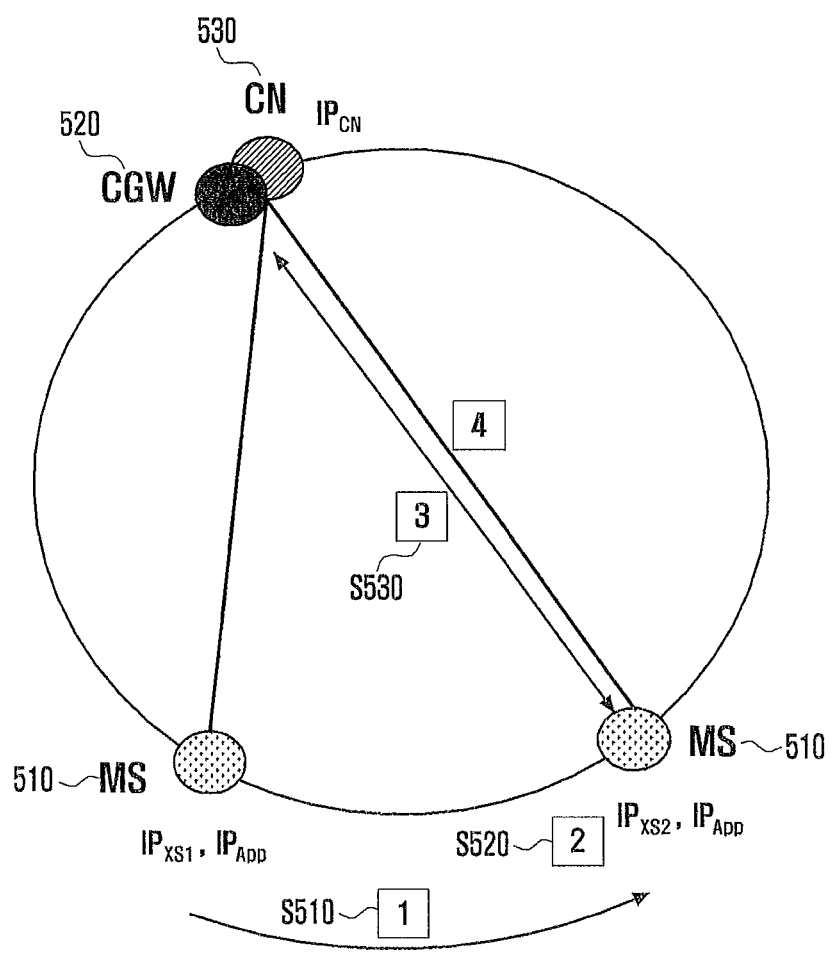
FIG. 5 illustrates an example process of managing MS mobility according to this disclosure.

FIG. 5 illustrates an example process of managing mobility of the MS according to this disclosure.

More specifically, FIG. 5 illustrates an example process of, when the MS moves to another access network (or subnet) and thus an IP address of the MS is changed, updating the IP address according to this disclosure.

First, it can be assumed that an MS 510 accesses a predetermined access network and receives an access network allocation address $IP_{xs1}$ from the access network which the MS 510 has accessed. Then, the MS 510 can receive the access network allocation address $IP_{xs1}$ and a CGW allocation address $IP_{app}$ from a CGW 520 corresponding to a CN 530 which the MS 510 accesses to receive a service.

Thereafter, the MS 510 can move to a new access network using a different IP prefix and access the new access network in step S510.

Then, the MS 510 can receive an access network allocation address IPxs2 from the new access network in step S520.

Thereafter, the MS 510 can update IPxs2 with respect to the CGW 520 corresponding to the CN 530 from which the MS 510 receives a service in step S530.

Then, a new tunnel can be formed between the MS 510 and the CGW 520 and traffic can be directly transmitted to the MS 510 from the CN 530.

In the related art, when an address which the MS receives from the access network is changed, the MS can update the changed address with respect to a previous access network. Accordingly, traffic transmitted to the MS can be forwarded to a new access network from the previous access network, thereby causing a problem such as transmission delay.

In contrast, the MS 510 can update the changed address with respect to the CGW 520 instead of the previous access network. Accordingly, the MS 510 can directly transmit/receive traffic to/from the CN 530 even though the access network is changed.

Figure 6:
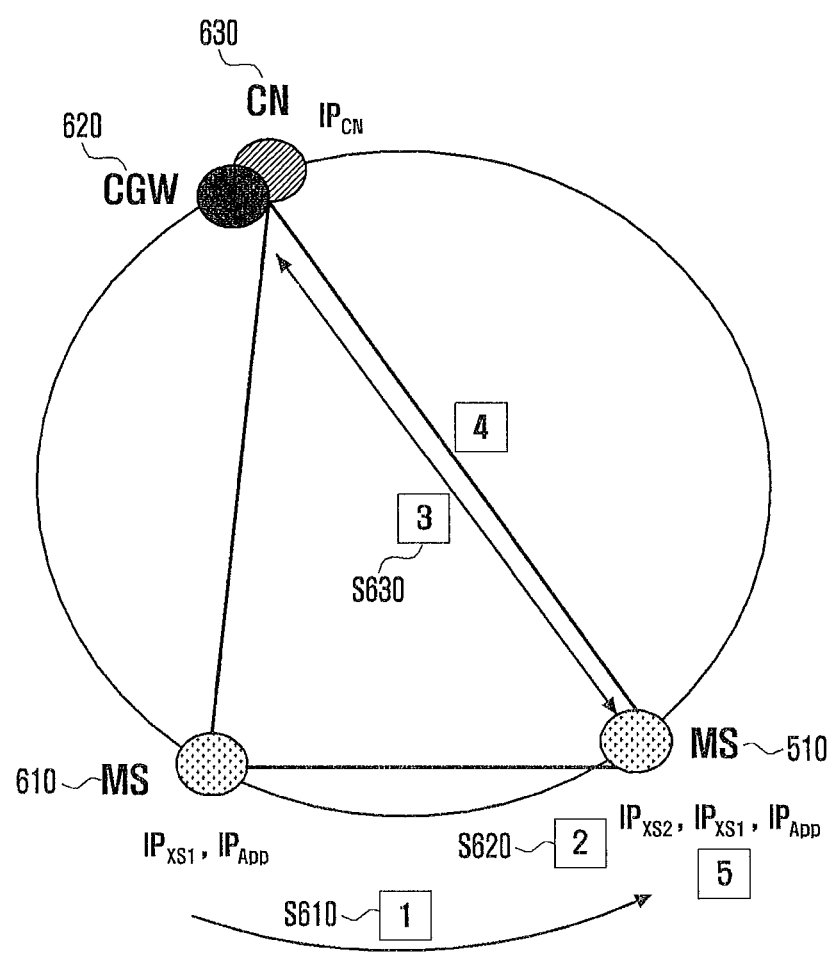
FIG. 6 illustrates an example process of managing MS mobility according to this disclosure.

FIG. 6 illustrates an example process of managing mobility of the MS according to this disclosure.

A difference between FIG. 6 and FIG. 5 can be that an MS 610 maintains an access network allocation address received from a previous access network for a predetermined period even after the MS 610 moves to a new access network.

First, it can be assumed that the MS 610 accesses a predetermined access network and receives an access network allocation address $IP_{xs1}$ from the access network which the MS 610 has accessed. Then, the MS 610 can receive the access network allocation address $IP_{xs1}$ and a CGW allocation address $IP_{app}$ from a CGW 620 corresponding to a CN 630 which the MS 610 accesses to receive a service.

Thereafter, the MS 610 can move to a new access network using a different IP prefix and access the new access network in step S610.

Then, the MS 610 can receive an access network allocation address $IP_{xs2}$ from the new access network in step S620. In this case, the MS 610 can maintain $IP_{xs1}$ which has been received from the previous access network without tearing down $IP_{xs1}$. The access network allocation address $IP_{xs1}$ can be used through an inter access network tunnel. For example, before a location of the MS is updated, traffic transmitted from the CN 630 can be forwarded through the previous access network by using $IP_{xs1}$.

Thereafter, the MS 610 can update $IP_{xs2}$ with respect to the CGW 620 corresponding to the CN 630 from which the MS 610 receives a service in step S630.

Then, a new tunnel can be formed between the MS 610 and the CGW 620 and traffic can be directly transmitted to the MS 610 from the CN 630.

Thereafter, the MS 610 can tear down IPxs1 which the MS 610 receives from the previous network in step S610.

Figure 7:
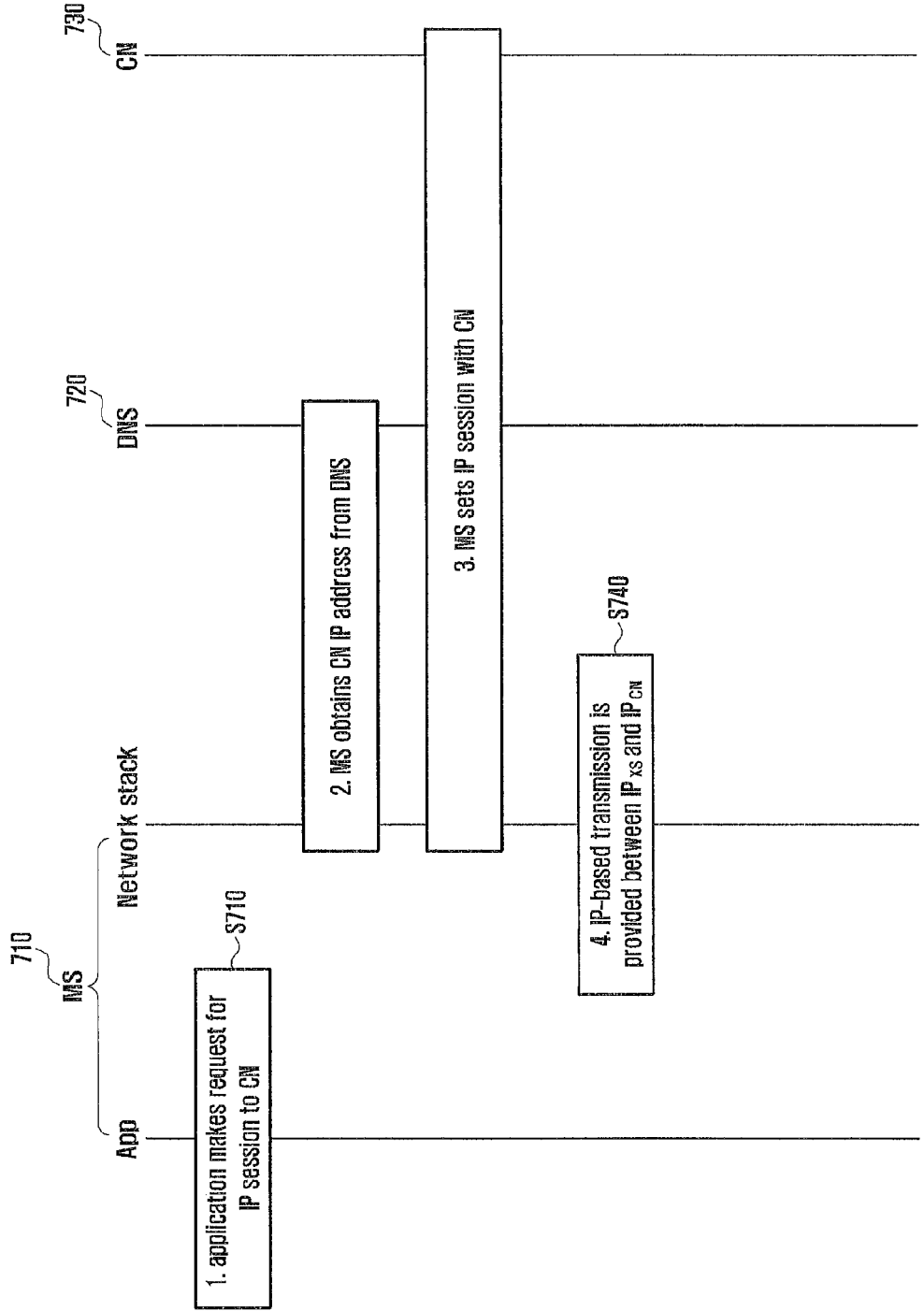
FIG. 7 is a flowchart illustrating an example general IP session setup process according to this disclosure.

FIG. 7 is a flowchart illustrating an example general IP session setup process according to this disclosure.

First, it is assumed that, when an MS 710 is divided according to each layer, the MS 710 can be divided into an application and a network stack.

The application of the MS 710 can make a request for an IP session to a CN 730 through the network stack of the MS in order to set the IP session in step S710.

Then, the network stack of the MS 710 can give a query about an IP address of the CN 730 to a DNS 720 and obtain the IP address of the CN 730 as a response to the query.

Then, the MS 710 can form an IP session with the CN 730 by using the obtained IP address of the CN 730.

In step S740, IP-based transmission can be provided between the address IPxs allocated by the access network and the address IPCN of the CN.

Figure 8:
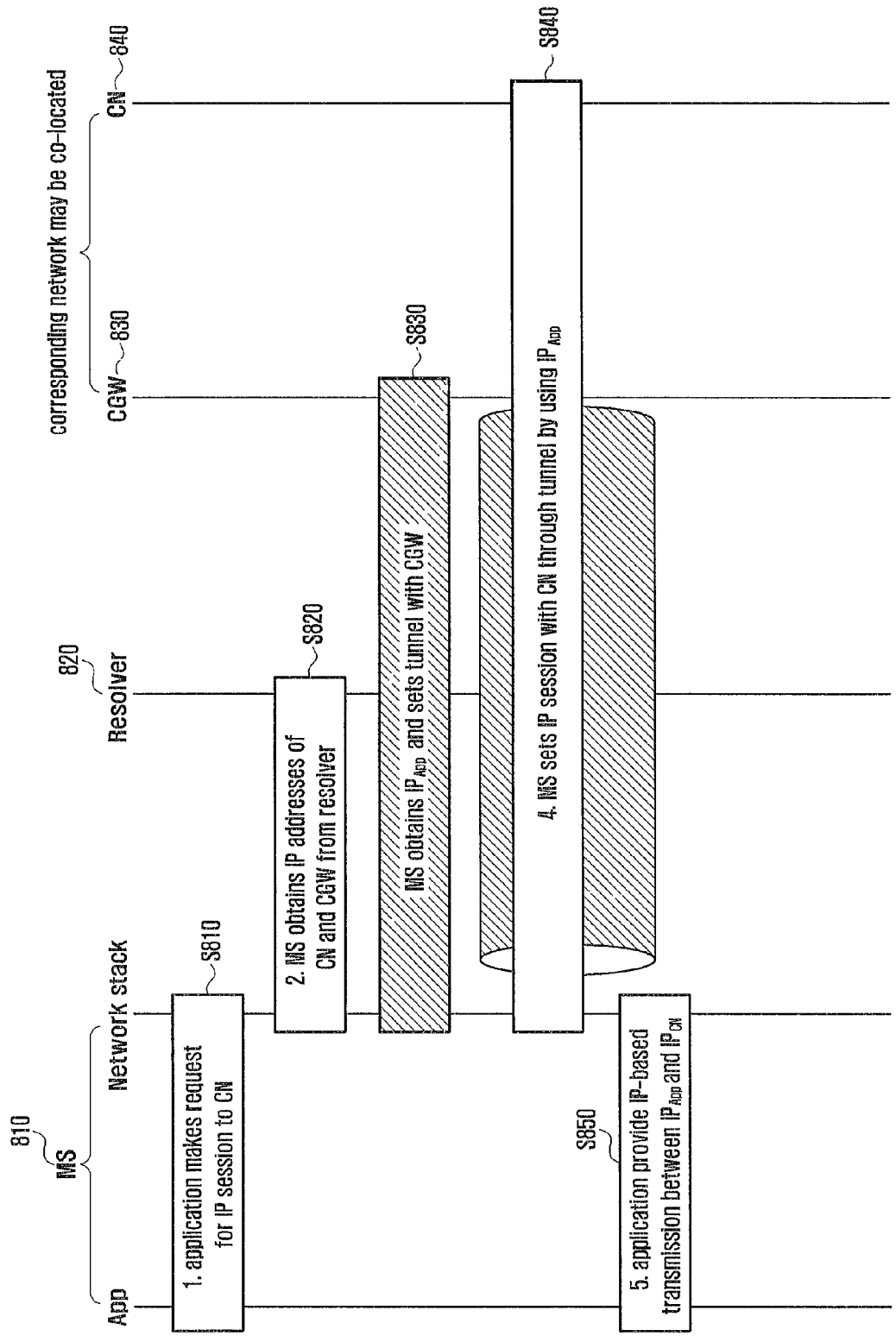
FIG. 8 is a flowchart illustrating an example IP session setup process according to this disclosure.

FIG. 8 is an example flowchart illustrating an IP session setup process according to this disclosure.

Similarly, it is assumed that, when an MS 810 is divided according to each layer, the MS 810 can be divided into an application and a network stack.

First, the application of the MS 810 can make a request for an IP session to a CN 840 through the network stack of the MS in order to set the IP session in step S810.

Then, in step S820, the network stack of the MS 810 can give a query about and IP address of the CN 840 and an IP address of a CGW 830 corresponding to the CN 840 to a resolver 820. Further, the network stack of the MS 810 can obtain the IP address of the CN 840 and the IP address of the CGW 830 corresponding to the CN 840 as a response to the query.

Then, in step S830, the network stack of the MS 810 can set a tunnel with the CGW 830 based on the obtained IP address of the CGW 830. In this case, the MS 810 can obtain a CGW allocation address $IP_{app}$ which the CGW 830 allocates to the MS 810.

Further, in step S840, the MS can set an IP session with the CN 840 by using the CGW allocation address $IP_{app}$ through the tunnel generated in the previous step.

Then, the application of the MS 810 can provide IP-based transmission between $IP_{app}$ allocated by the CGW 830 and the IP address $IP_{CN}$ of the CN 840 in step S850.

Figure 9:
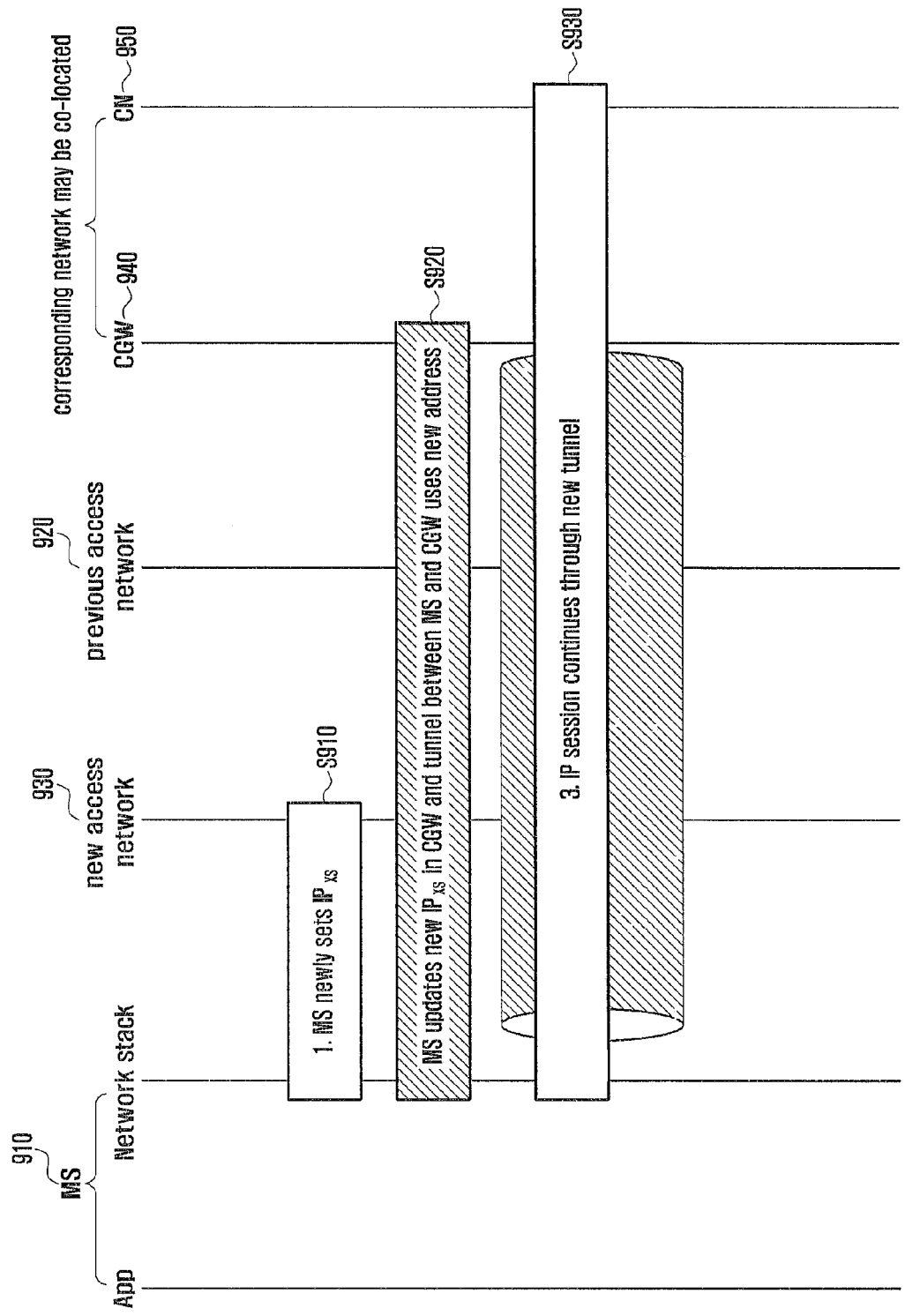
FIG. 9 illustrates an example process of a handover process performed by an MS according to this disclosure.

FIG. 9 illustrates an example process illustrating a handover process performed by an MS according to this disclosure.

First, when an MS 910 is divided according to each layer, it can be assumed that the MS 910 is divided into an application and a network stack, but functions performed by respective layers can be performed by the MS 910 in FIG. 9.

Prior to the description of FIG. 9, it can be assumed that the MS 910 accesses a predetermined access network 920, forms an IP session with a CN 950, and transmits/receives traffic through the IP session.

Thereafter, the MS 910 can access a new access network 930 in step S910. Then, the MS 910 can receive an access network allocation address $IP_{xs}$ from the new access network 930.

In step S920, the MS 910 can update the newly received access network allocation address $IP_{xs}$ in a CGW 940. The CGW 940 can be a CGW corresponding to a CN 950 to/from which the MS 910 transmits/receives traffic. Then, a tunnel between the MS 910 and the CGW 940 can be formed based on the updated $IP_{xs}$.

As illustrated in step S930, an IP session between the MS 910 and the CN 950 can continue through the new tunnel generated in step S920.

Figure 10:
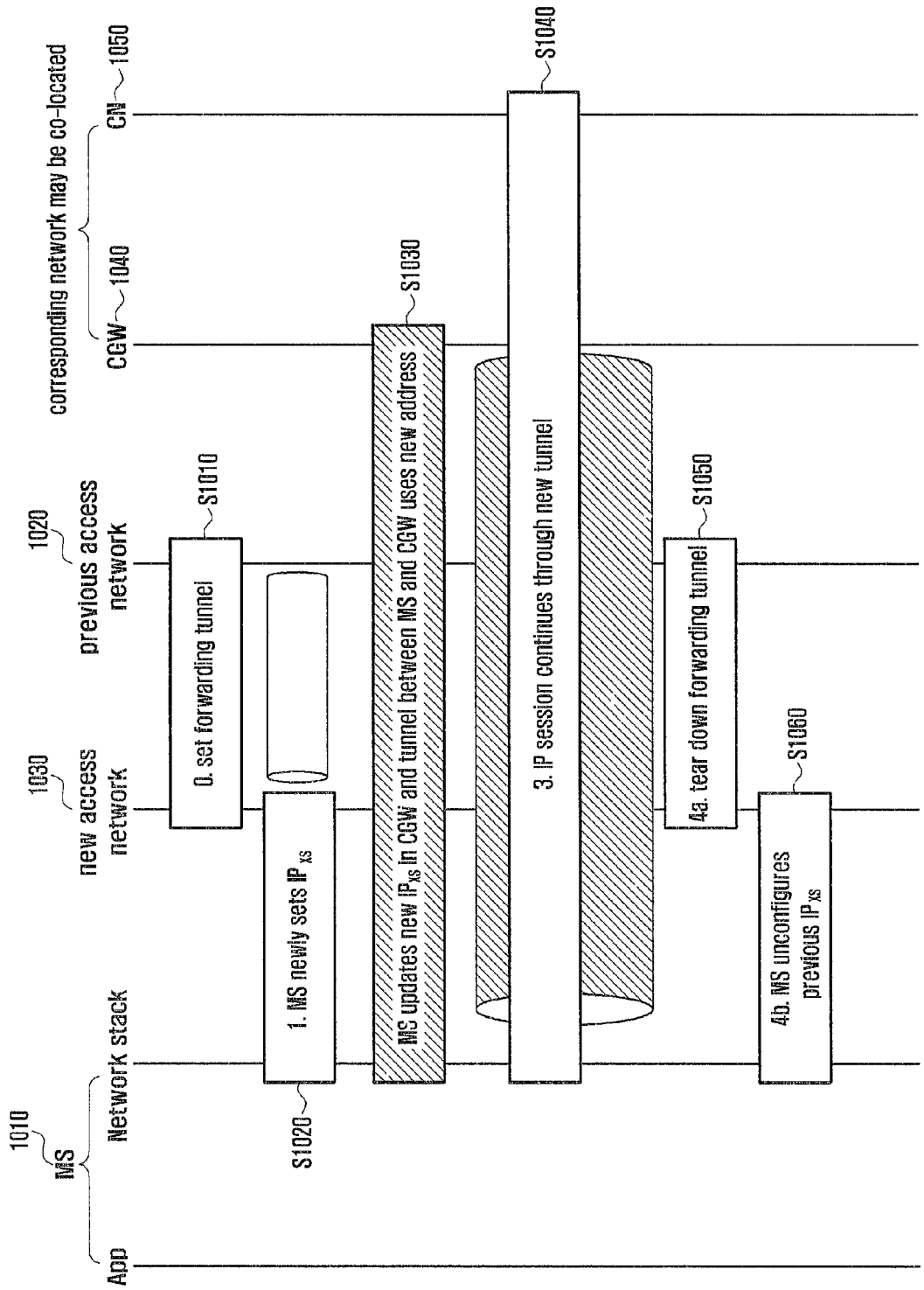
FIG. 10 is a flowchart illustrating an example handover process performed by an MS according to this disclosure.

FIG. 10 illustrates an example process illustrating a handover process performed by an MS according to this disclosure.

First, when an MS 1010 is divided according to each layer, it can be assumed that the MS 1010 is divided into an application and a network stack, but functions performed by respective layers can be performed by the MS 910 in FIG. 10.

As illustrated in FIG. 10, in step S1010, a forwarding tunnel can be set between an access network 1020 which the MS 1010 previously accessed and a new access network 1030 which the MS 1010 newly accesses. The forwarding tunnel can forward traffic to be transmitted to the MS 1010 before a tunnel from the MS 1010 to a CGW 1040 is formed.

Thereafter, the MS 1010 can access the new access network 1030 in step S1020. Then, the MS 1030 can receive an access network allocation address IPxs from the new access network 1030.

In step S1030, the MS 1010 can update the newly received access network allocation address $IP_{xs}$ in the CGW 1040. The CGW 1040 can be a CGW corresponding to a CN 1050 to/from which the MS 1010 transmits/receives traffic. Then, a tunnel between the MS 10100 and the CGW 1040 can be formed based on the updated $IP_{xs}$.

As illustrated in step S1040, an IP session between the MS 1010 and the CN 1040 can be switched to the new tunnel.

After the switching to the new tunnel, the forwarding tunnel between the previous access network 1020 and the new access network 1030 can be torn down in step S1050. In step S1060, the MS 1010 can unconfigure the IP address allocated by the previous access network 1020.

Figure 11:
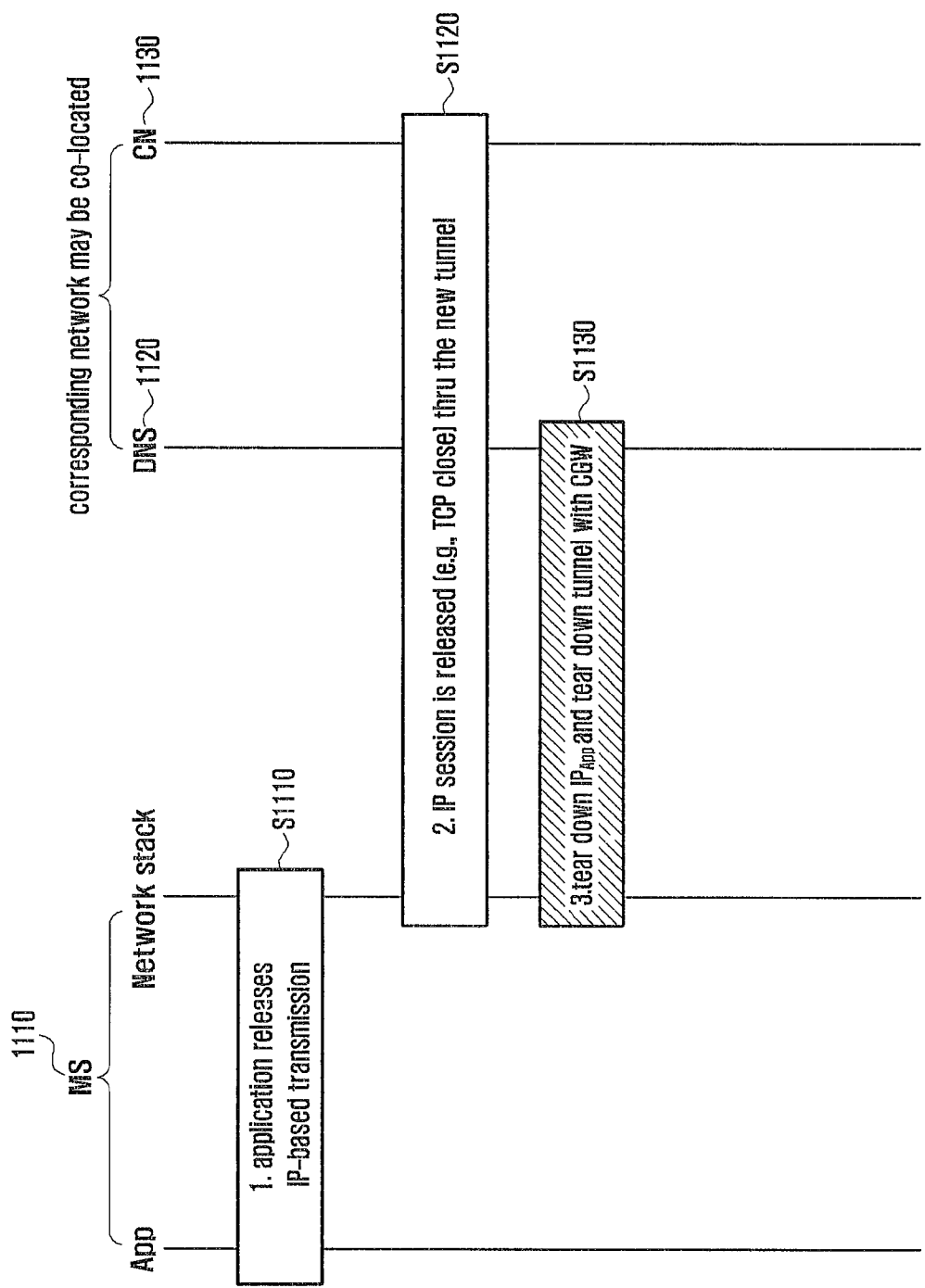
FIG. 11 is a flowchart illustrating an example process in which an MS tears down an IP session with a CN according to this disclosure.

FIG. 11 is a flowchart illustrating an example process in which an MS tears down an IP session with a CN according to this disclosure.

First, it can be assumed that, when an MS 1110 is divided according to each layer, the MS 1110 can be divided into an application and a network stack.

The application of the MS 1110 can make a request for tearing down IP-based transmission to the network stack of the MS 1110 in step S1110.

Then, the network stack of the MS 1110 can tear down an IP session with a CN 1130 in step S1120.

The MS 1110 can tear down $IP_{app}$ allocated by a CGW 1120 and tear down a tunnel with the CGW 1120 in step S1130.

Figure 12:
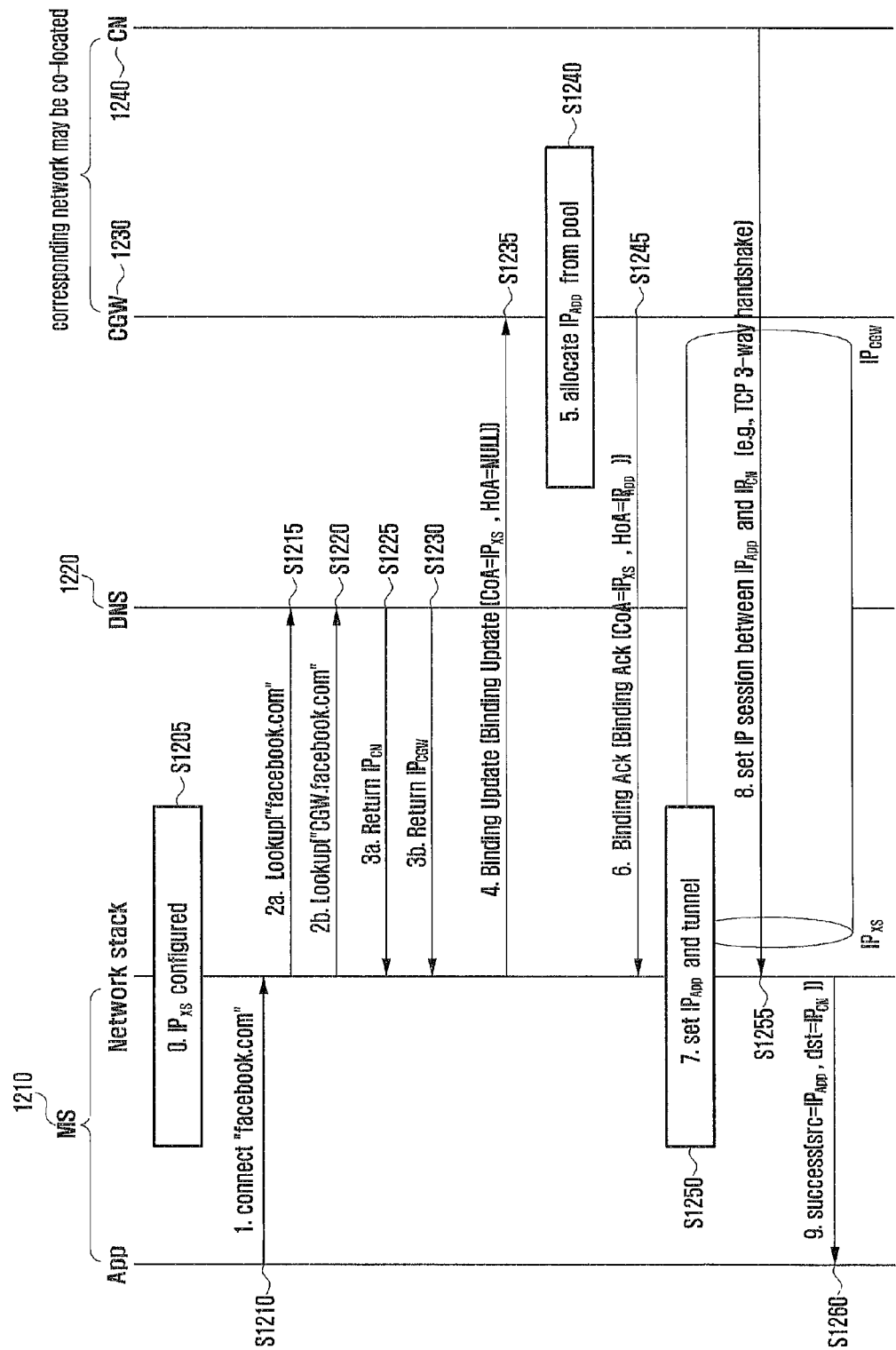
FIG. 12 is a flowchart illustrating an example detailed call flow according to this disclosure.

FIG. 12 is a flowchart illustrating an example detailed call flow according to this disclosure.

Specifically, FIG. 12 illustrates an example process in which an MS 1210 accesses a Facebook server.

First, the MS 1210 can receive an access network allocation address IPXS from an access network which the MS 1210 has accessed in step S1205. Further, the MS 1210 can receive a request for an access to "facebook.com" from an application in step S1210.

Then, the MS 1210 can transmit a lookup message for querying an IP address of "facebook.com" to a DNS server 1220 in step S1215. Simultaneously, the MS 1210 can transmit a lookup message for querying an IP address of a CGW for the Facebook server, that is, an IP address of "CGW.facebook.com" to the DNS server 1220 in step S1220.

Then, the MS 1210 can receive back an IP address $IP_{CN}$ of a CN 1240 corresponding to the Facebook server in response to the query in step S1225. Similarly, the MS 1210 can receive back the IP address $IP_{CGW}$ of the CGW 1230 for the Facebook server in response to the query in step S1230.

Thereafter, the MS 1210 can transmit a binding update message to the CGW 1230 in step S1235. In this case, CoA of the binding update message can be set as $IP_{xs}$ and HoA can be set as NULL.

The CGW 1230 having received the binding update message identifies that HoA can be set as NULL and then can allocate a predetermined CGW allocation IP address $IP_{APP}$ of a CGW allocation IP address pool possessed by the CGW 1230 to the MS 1210 in step S1240.

Further, the CGW 1230 can transmit a binding Ack message in which CoA can be set as $IP_{XS}$ and HoA can be set as $IP_{APP}$ to the MS 1210 in step S1245.

Then, the MS 1210 can identify and store the setup of $IP_{APP}$ by the CGW 1230 in step S1250. As a result, a tunnel can be formed between the MS 1210 and the CGW 1230.

Thereafter, the MS 1210 can set an IP session between the MS 1210 and the CN 1240 by using $IP_{APP}$ and $IP_{CN}$ in step S1255. In an embodiment, the IP session setup can be made using TCP 3-way handshake.

When the IP session is successfully set between the MS 1210 and the CN 1240, the network stack of the MS 1210 can report a success message to the application of the MS 1210 in step S1260. In this case, a source address can be reported as $IP_{APP}$ and a destination address can be reported as $IP_{cN}$.

Figure 13:
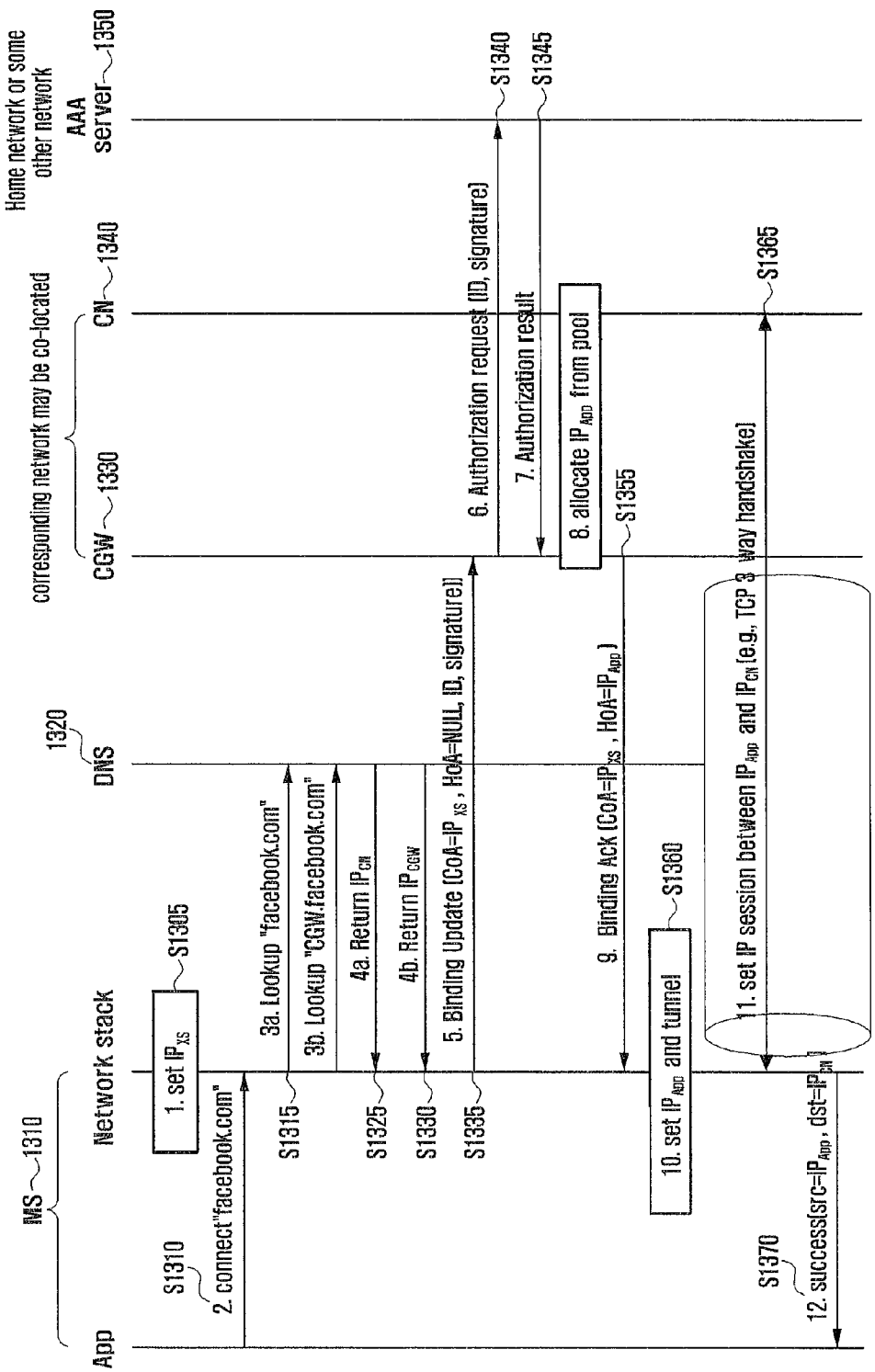
FIG. 13 is an example flowchart including a process of authenticating whether an MS which accesses a Facebook server is authorized according to this disclosure.

FIG. 13 is an example flowchart further including a process of authenticating whether an MS 1310 which accesses a Facebook server is authorized according to this disclosure.

First, the MS 1310 can receive an access network allocation address IPXS from an access network which the MS 1310 has accessed in step S1305. Further, the MS 1210 can receive a request for an access to "facebook.com" from an application in step S1310.

Then, the MS 1310 can transmit a lookup message for querying an IP address of "facebook.com" to a DNS server 1320 in step S1315. Simultaneously, the MS 1310 can transmits a lookup message for querying an IP address of a CGW for a Facebook server, that is, an IP address of "CGW.facebook.com" to the DNS server 1320.

Then, the MS 1310 can receive back an IP address $IP_{CN}$ of a CN 1340 corresponding to the Facebook server in response to the query in step S1325. Similarly, the MS 1310 can receive back an IP address $IP_{CGW}$ of the CGW 1330 for the Facebook server in response to the query in step S1330.

Thereafter, the MS 1310 can transmit a binding update message to the CGW 1330 in step S1335. In this case, CoA of the binding update message can be set as $IP_{XS}$ and HoA can be set as NULL. Further, the binding update message can further include information on an ID for authenticating the MS and information on signature.

The CGW 1330 having received the binding update message can perform an authentication process for identifying whether the MS 1310 is authorized to access facebook.com. To this end, the CGW 1330 can transmit an authorization request message for making a request for authenticating the MS 1310 to an authentication server (for example, an AAA server) 1350 in step S1340. The authorization request message can include information on an ID and information on signature of the MS 1310. Information on the MS can be equal to information included in the binding update message which the MS 1310 has transmitted to the CGW 1330.

Further, the CGW 1330 can receive an authorization result from the authentication server 1350 in step S1345. As the authorization result, when the MS 1310 is authorized as an MS having the right, the CGW 1330 can allocate a predetermined CGW allocation IP address $IP_{APP}$ of the CGW allocation IP address pool possessed by the CGW 1330 to the MS 1310.

Further, the CGW 1330 can transmit a binding Ack message in which CoA is set as $IP_{XS}$ and HoA is set as $IP_{APP}$ to the MS 1310 in step S1355.

Then, the MS 1310 can identify and store the setup of $IP_{APP}$ by the CGW 1330 in step S1360. As a result, a tunnel can be formed between the MS 1310 and the CGW 1330.

Thereafter, the MS 1310 can set an IP session between the MS 1310 and a CN 1340 by using $IP_{APP}$ and $IP_{CN}$ in step S1365. In an embodiment, the IP session setup can be made using TCP 3-way handshake.

When the IP session is successfully set between the MS 1310 and the CN 1340, the network stack of the MS 1310 can report a success message to the application of the MS 1310 in step S1370. In this case, a source address can be reported as $IP_{APP}$ and a destination address can be reported as $IP_{CN}$.

FIGS. 14A and 14B are example views describing an IP address allocated to each node when an MS accesses a CN through a local gateway according to this disclosure.

In FIGS. 14A and 14B, an expanded application can be made in an LTE Selected IP Traffic Offload (SIPTO) environment. A difference between the embodiment of FIGS. 14A and 14B and the previous embodiment can be that an end of a tunnel generated by a CGW 1420 can be not an MS 1450 but a Local Gateway (LGW) 1430. That is, the LGW can exist.

The LGW illustrated in FIGS. 14A and 14B can serve as a proxy which will be described below in more detail. In an embodiment of the present disclosure described above, the MS can obtain the IP address of the CGW, perform a binding update based on the obtained IP address of the CGW, obtain $IP_{APP}$, and form tunneling. In contrast, the LGW illustrated in FIGS. 14A and 14B can perform the above functions on behalf of the MS.

Meanwhile, the SIPTO can have three network structures. For example, the three network structures can include a structure in which an (H)eNB and a LGW coexist, a structure in which a local S-GW and an L-GW coexist, and a structure in which an LGW separately exists. The LGW 1430 can serve to connect a Mobility Management Entity (MME) 1460 and an evolved NodeB (eNB) 1440, and serve as an end of a tunnel generated by the CGW 1420.

The SIPTO illustrated in FIGS. 14A and 14B can have the structure in which the local S-GW and the LGW coexist. Although embodiments of the present disclosure will be described based on the above structure, the embodiments are not limited thereto and can be applied to all SIPTO structures.

As illustrated in FIGS. 14A and 14B, the MS 1450 can access the CGW 1420 and a CN (such as remote end 2) 1410 via the eNB 1440 and the LGW/SGW 1430. In this case, IP addresses allocated to each node and each application will be described with reference to FIG. 14B.

FIG. 14B is an example view illustrating distinguished addresses allocated to the LGW, the CGW, and the CN (end) according to this disclosure.

Referring to FIG. 14B, an end of the tunnel formed by the CGW 1420 can be the LGW 1430 and an IP address of the LGW 1430 can be $IP_{LGW}$. Further, when the MS 1410 accesses different CNs, the MS 1410 can have CGW allocation addresses $IP_{app1}$, $IP_{app2}$, and $IP_{app3}$ which are allocated by CGWs corresponding to the respective CNs.

The LGW 1430 can store a mapping relation between a CGW allocation address allocated to an application of a particular MS and its own IP address IPLGW. Further, the mapping relation can also include the CGW 1420, and thus the CGW 1420 can identify an LGW corresponding to a particular MS and transmit traffic through a tunnel formed for the identified LGW.

Figure 14:
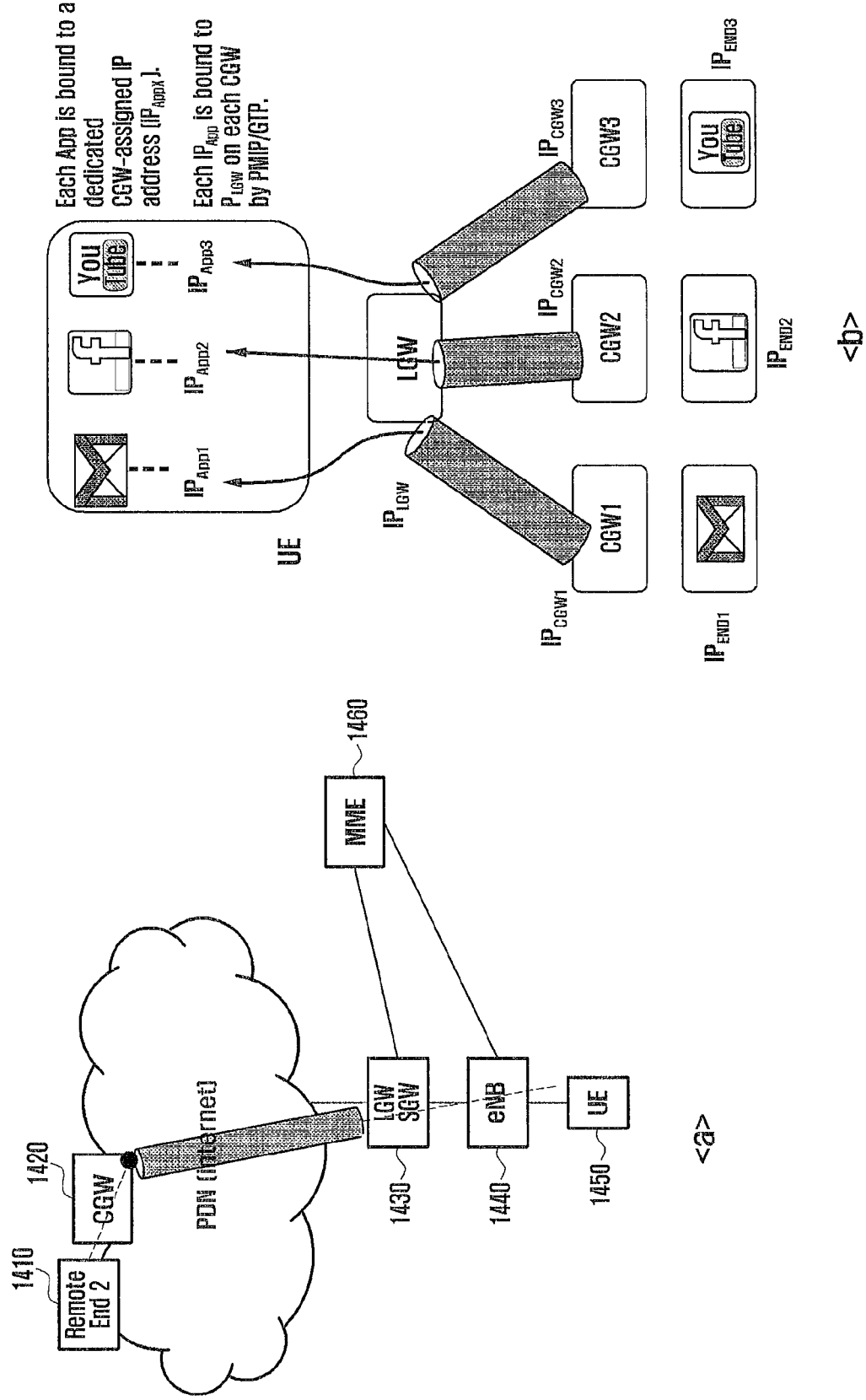
FIGS. 14A and 14B are example views describing an IP address allocated to each node when an MS accesses a CN through a local gateway according to this disclosure.
Figure 15:
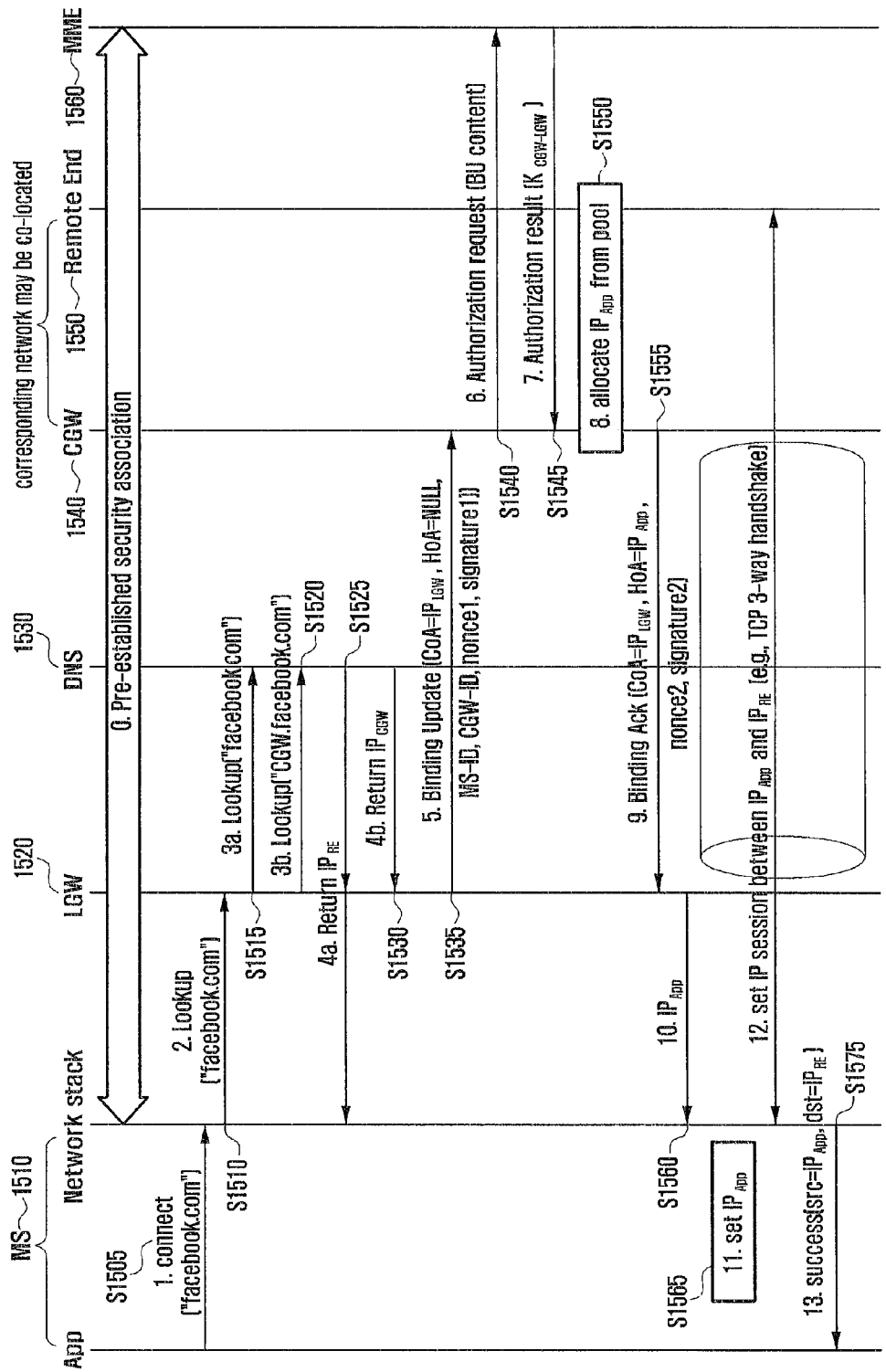
FIG. 15 is a flowchart illustrating an example process of forming an IP session between an MS and a CN based on a structure of FIG. 14 according to this disclosure.

FIG. 15 is a flowchart illustrating an example process of forming an IP session between an MS and a CN based on the structure of FIG. 14 according to this disclosure.

Specifically, FIG. 15 illustrates a process in which an MS 1510 can access a Facebook server.

Further, the MS 1510 can receive a request for an access to "facebook.com" from an application in step S1505.

Then, the MS 1510 can transmit a lookup message for querying an IP address of "facebook.com" to an LGW 1520 in step S1510. The LGW 1450 can transmit the lookup message to a DNS server 1530 in step S1515. Simultaneously, the LGW 1520 can transmit a lookup message for querying an IP address of a CGW for the Facebook server, that is, an IP address of "CGW.facebook.com" to the DNS server 1520 in step S1520.

Then, the MS 1510 can receive back an IP address $IP_{RE}$ of a CN 1550 (illustrated as a remote end in FIG. 15) (the two terms can be used as the same meaning) corresponding to the Facebook server through the LGW 1520 in response to the query in step S1525. Meanwhile, the LGW 1520 can receive back an IP address $IP_{CGW}$ of the CGW 1540 for the Facebook server in step S1530.

Thereafter, the MS 1520 can transmit a binding update message to the CGW 1540 in step S1535. In this case, CoA of the binding update message can be set as $IP_{LGW}$ and HoA can be set as NULL. Further, the binding update message can further include identification information of the MS (MS-ID), identification information of the CGW 1540 (CGW-ID), nonce 1, and signature 1.

The CGW 1540 having received the binding update message can perform an authentication process for identifying whether the MS 1510 is authorized to access facebook.com. To this end, the CGW 1540 can transmit an authorization request message for making a request for authenticating the MS 1510 to an MME 1560 serving as an authentication server in step S1540.

Further, the CGW 1540 can receive an authorization result from the MME 1560 in step S1545. As the authorization result, when the MS 1510 is authorized as an MS having the right, the CGW 1540 can allocate a predetermined CGW allocation IP address $IP_{APP}$ of the CGW allocation IP address pool possessed by the CGW 1540 to the MS 1510 in step S1550.

Further, the CGW 1540 can transmit a binding Ack message in which CoA is set as $IP_{LGW}$ and HoA is set as $IP_{APP}$ to the LGW 1520 in step S1555. The binding Ack message can further include nonce 2 and signature 2.

Then, the LGW 1520 can transmit the CGW allocation address $IP_{APP}$ to the MS 1510 in step S1560.

The MS 1510 can identify and store the setup of $IP_{APP}$ by the CGW 1540 in step S1565.

Thereafter, the MS 1510 can set an IP session between the MS 1510 and the CN 1550 by using $IP_{APP}$ and $IP_{RE}$ in step S1575. In an embodiment, the IP session setup can be made using TCP 3-way handshake.

When the IP session is successfully set between the MS 1510 and the CN 1550, the network stack of the MS 1510 can report a success message to the application of the MS 1510 in step S1575. In this case, a source address can be reported as $IP_{APP}$ and a destination address can be reported as $IP_{RE}$.

Figure 16:
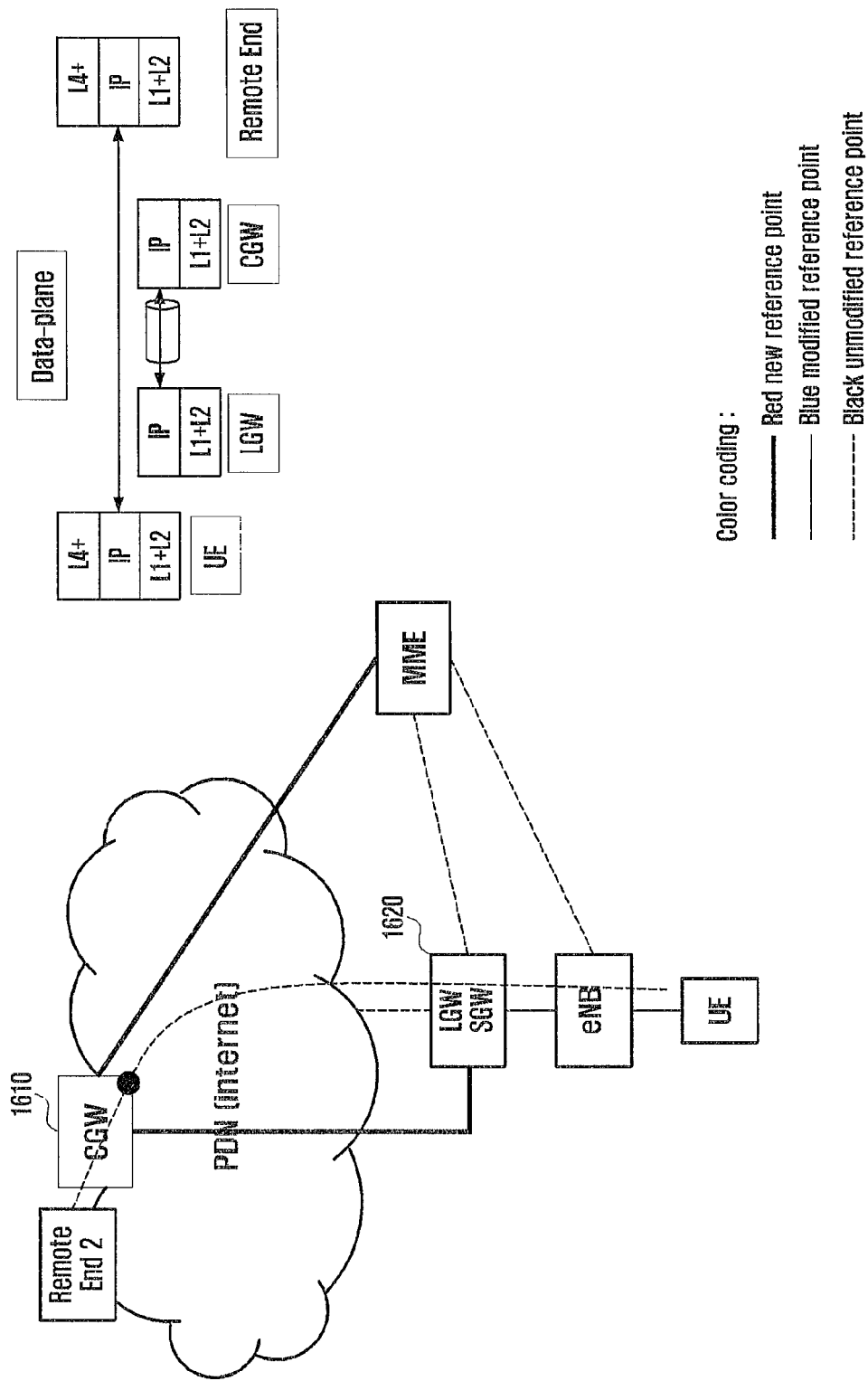
FIG. 16 illustrates an example process of forming a tunnel between mobile communication nodes according to this disclosure.

FIG. 16 illustrates an example process of forming a tunnel between mobile communication nodes according to this disclosure.

As illustrated in FIG. 16, a tunnel can be formed between an LGW 1620 and a CGW 1610 in an SIPTO structure. Formation of a tunnel between an LGW 1620 and a CGW 1610 can mean that a packet is encapsulated into $IP_{CGW}$ and $IP_{LGW}$ and the MS and a remote end communicate by using $IP_{app}$ and $IP_{RE}$.

Figure 17:
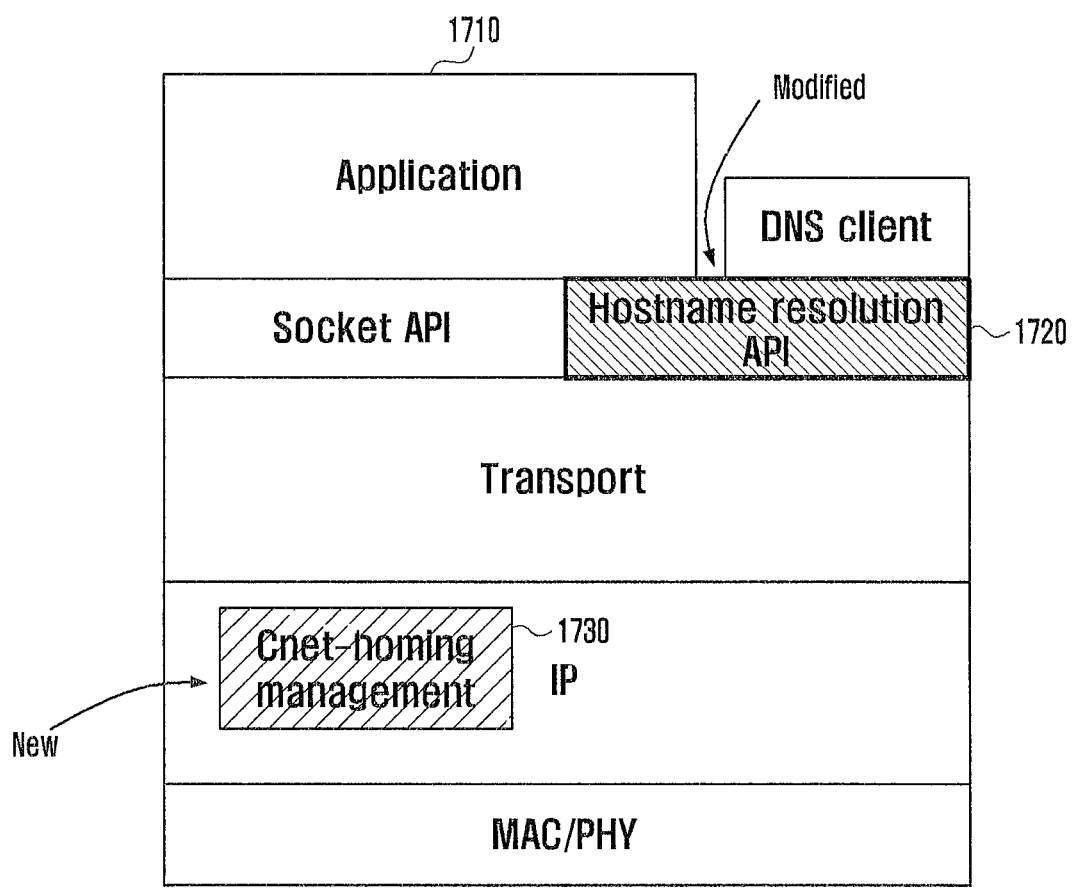
FIG. 17 illustrates an example protocol stack of an MS according to this disclosure.

FIG. 17 illustrates an example protocol stack of an MS according to this disclosure.

First, when an application 1710 attempts to access a particular site (such as a server, a CN or the like), the application 1710 can be required to obtain an IP address of the site. To this end, the application 1710 can call a function defined in a Hostname Resolution API 1720. The function can be "gethostbyname( )". "Gethostbyname( )" can be a parameter which receives a DNS name (such as www.facebook.com) and can return an IP address of the site as a result value. In an embodiment, since the application 1710 can be required to know not only the IP address of the particular site but also an IP address of a CGW of the site, gethostbyname( ) is changed. That is, even though the application 1710 gives only the DNS name of the particular site as a parameter, the function can automatically add a CGW DNS name to make a request for the CGW DNS name to a DNS client. As a result, the function can return IP addresses of two sites, for example, IP addresses of facebook.com and cgw.facebook.com.

Meanwhile, since the IP address of the CGW can be used by a Cnet-homing management 1730, the IP address of the CGW may not be returned to the application 1710.

After obtaining the IP address of the site, the application 1710 can attempt to access the site through connect( ) (in a case of a TCP) or sendto( ) (in a case of a UDP).

In this case, a source IP address of the MS can be determined. In an embodiment, each application 1710 can use a different IP address as the source IP address. As described above, the source IP address can be allocated by the CGW corresponding to the corresponding site.

Meanwhile, a module of the Cnet-homing management 1730 can be defined in a network layer. The module of the Cnet-homing management 1730 can receive a source IP address to be used by the application 1710 from the CGW and binding-updates an IP address of the MS (such as $IP_{XS}$)

in the CGW. Accordingly, a tunnel can be formed between the MS and the CGW and traffic can be transmitted/received through the formed tunnel.

Figure 18:
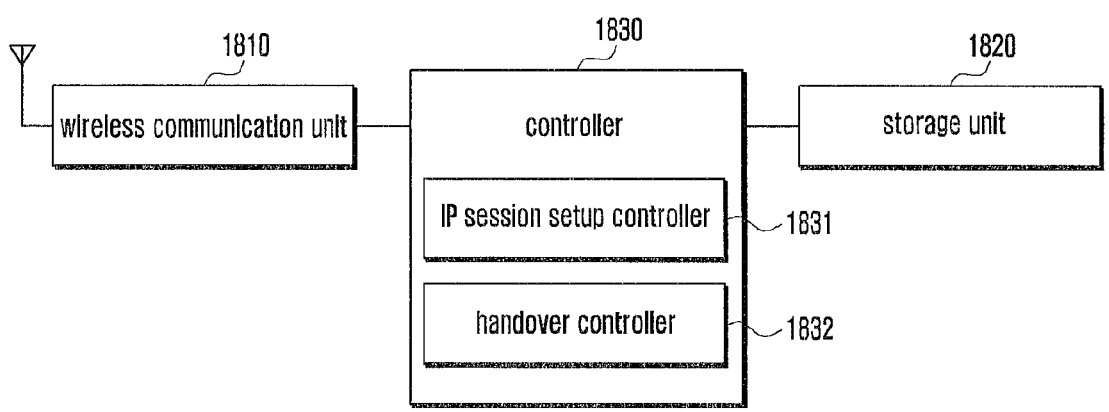
FIG. 18 is a block diagram illustrating an example internal structure of an MS according to this disclosure.

FIG. 18 is a block diagram illustrating an example internal structure of an MS according to this disclosure. As illustrated in FIG. 18, the MS can include a wireless communication unit 1810, a storage unit 1820, and a controller 1830.

The wireless communication unit 1810 can perform a function of transmitting/receiving corresponding data for wireless communication of the MS. The wireless communication unit 1810 can include a Radio Frequency (RF) transmitter for up-converting and amplifying a frequency of a transmitted signal and an RF receiver for low noise-amplifying a received signal and down-converting a frequency. Further, the wireless communication unit 1810 can receive data or traffic through a wireless channel, output the received data or traffic to the controller 1830, and transmit the data output from the controller 1830 through a wireless channel.

The storage unit 1820 can store a program and data required for operations of the MS and can be divided into a program region and a data region. The program region can store a program for controlling general operations of the MS, an Operating System (OS) for booting the MS, an application program required for reproducing multimedia contents, and an application program required for other optional functions of the MS. The data region can be a region in which data generated according to the use of data can be stored.

The controller 1830 can control a signal flow between blocks included in the MS. For example, the controller 1830 can receive an IP address of each application executed in the MS and control a series of processes of forming a tunnel and setting an IP session with a CGW and a CN corresponding to the application.

To this end, the controller 1830 can further include an IP session setup controller 1831 and a handover controller 1832.

The IP session setup controller 1831 can query an IP address of a CN corresponding to a predetermined application and an IP address of a corresponding gateway corresponding to the CN to obtain the IP addresses. Further, the IP session setup controller 1831 can access the corresponding gateway based on the IP address of the corresponding gateway. The IP session setup controller 1831 can receive the corresponding gateway allocation IP address from the corresponding gateway and form a tunnel between the MS and the corresponding gateway. Subsequently, the IP session setup controller 1831 can set an IP session between the MS and the CN based on the IP address of the CN and the corresponding gateway allocation IP address.

In this case, the corresponding gateway can be located geographically close to the CN and the corresponding gateway allocation IP address can be allocated in accordance with the application.

Meanwhile, when the MS moves to a new access network, the handover controller 1832 can receive a new access network allocation IP address form the new access network. Further, the handover controller 1832 can transmit information on the new access network allocation IP address to the corresponding gateway and can make a control to reset a tunnel between the MS and the corresponding network.

In an embodiment, before the tunnel between the MS and the network is reset, the handover controller 1832 can make a control to receive traffic via the previously accessed access network before moving to the new access network.

Figure 19:
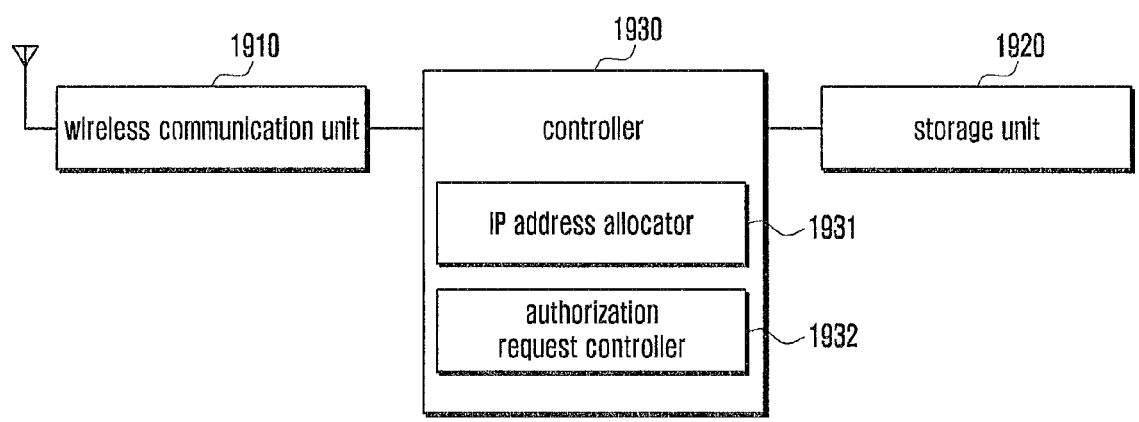
FIG. 19 is a block diagram illustrating an example internal structure of a CGW according to this disclosure.

FIG. 19 is a block diagram illustrating an example internal structure of a CGW according to this disclosure. As illustrated in FIG. 19, the CGW can include an interface unit 1910, a storage unit 1920 and a controller 1930.

The CGW can have a feature of being located geographically close to a CN corresponding to a predetermined application.

The interface unit 1910 can perform a function of transmitting/receiving corresponding data for wired or wireless communication of the CGW.

The storage unit 1920 can serve to store a program and data required for operations of the CGW and can be divided into a program region and a data region. A detailed description thereof has been made above, so it will be omitted.

The controller 1930 can control a signal flow between blocks included in the CGW. For example, the controller 1930 can allocate a CGW allocation IP address to each MS accessing the CGW and control a series of processes of making a request for authenticating the MS to an authentication server.

To this end, the controller 1930 can further include an IP address allocator 1931 and an authorization request controller 1932.

The IP address allocator 1931 can receive a binding update message from a predetermined MS and allocate a corresponding gateway allocation IP address to the MS. Further, the IP address allocator 1931 can make a control to transmit a binding Ack message including information on the corresponding gateway allocation IP address to the MS to form a tunnel between the MS and the corresponding gateway.

In an embodiment, the IP address allocator 1931 can allocate the corresponding gateway allocation IP address to each MS accessing the CN.

Meanwhile, when an access network which the MS accesses is changed, the IP address allocator 1931 can receive information on a new access network allocation IP address, which a changed new access network allocates to the MS, from the MS. Then, a tunnel can be reset based on the CGW allocation IP address and the new access network allocation IP address.

The authorization request controller 1932 can receive the binding update message from the MS and can transmit an authorization request message for making a request for authenticating the MS to the authentication server. Further, when receiving an authorization result message from the authentication server, the authorization request controller 1932 can allocate the corresponding gateway allocation IP address to the MS.

In an embodiment, all traffic between the CN and the MS should pass through the CGW. Accordingly, the MS and the CN can communicate through an optimal route, thereby reducing a data transmission delay. Further, traffic heading for a particular site may not pass through a core anchor, so that scalability of the core anchor can be reduced.

Although the present disclosure has been described with an exemplary embodiment, various changes and modifications can be suggested to one skilled in the art. It can be intended that the present disclosure encompass such changes and modifications as fall within the scope of the appended claims.

What is claimed is:

1. A method of generating an internet protocol (IP) session in a mobile communication system by a terminal, the method comprising:

receiving an IP address of a node corresponding to an application executed by a terminal and a first IP address of a gateway corresponding to the node;

generating a tunnel with the gateway based on the first IP address of the gateway;

receiving a second IP address, which is allocated based on the node by the gateway, from the gateway for communicating with the node;

generating an IP session with the node based on the second IP address and the IP address of the node; and transmitting and receiving a packet of the application through the IP session.

2. The method of claim 1, wherein the gateway is located within a predetermined distance from the node.

3. The method of claim 1, wherein the second IP address is allocated by the gateway in accordance with the application executed by the terminal.

4. The method of claim 1, further comprising receiving an access network IP address from an access network that the terminal accesses.

5. The method of claim 4, further comprising:

moving, by the terminal, to a target access network from the access network;

receiving a target access network IP address from the target access network; and transmitting information of the target access network IP address to the gateway and resetting a tunnel between the terminal and a target network.

6. The method of claim 5, further comprising, before the tunnel between the terminal and the target network is reset, receiving traffic via the access network that the terminal previously accessed before moving to the target access network.

7. A method of setting a data route in a mobile communication system by a gateway, the method comprising:

if internet protocol (IP) address of a node corresponding to an application executed by a terminal and a first IP address of a gateway corresponding to the node are transmitted to the terminal, transmitting a second IP address, which is allocated based on the node by gateway for communication between the terminal with the node, to the terminal;

generating a tunnel with the terminal based on the first IP address of the gateway; and if an IP session between the terminal and the node is generated based on the second IP address and the IP address of the node, transmitting and receiving a packet of the application through the IP session, wherein the gateway is located within a predetermined distance from the node.

8. The method of claim 7, wherein the transmitting second IP address comprises allocating the second IP address to each terminal that accesses the node.

9. The method of claim 7, further comprising, after an access network that the terminal accesses is changed, receiving information on a target access network IP address, that a changed target access network allocates to the terminal, from the terminal.

10. The method of claim 7, further comprising:

transmitting an authorization request message to make a request to authenticate the terminal to an authentication server; and transmitting the second IP address to the terminal after an authorization result message is received from the authentication server.

11. A method of setting a data route in a mobile communication system, the method comprising:

receiving, by a terminal, an IP address of a node corresponding to an application executed by a terminal and a first IP address of a gateway corresponding to the node;

generating a tunnel between the terminal and the gateway based on the first IP address of the gateway;

transmitting, by the gateway, a second IP address, which is allocated based on the node by gateway for communication between the terminal with the node, to the terminal;

generating an IP session between the terminal and the node based on the second IP address and the IP address of the node; and transmitting and receiving a packet of the application through the IP session, wherein the gateway is located within a predetermined distance from the node corresponding to the application.

12. The method of claim 11, wherein the transmitting the IP address comprises:

transmitting, by the gateway, an authorization request message to request an authentication of the terminal to an authentication server;

authorizing, by the authentication server, the terminal based on identification information of the terminal included in the authorization request message and identification information of the gateway;

transmitting, by the authentication server, an authorization result message to the gateway when performing the authentication; and allocating, by the gateway, a gateway allocation IP address to the terminal when receiving the authorization result message from the authentication server.

13. The method of claim 11, further comprising:

moving, by the terminal, to a target access network from an access network;

receiving a target access network allocation IP address from the target access network; and transmitting information of the target access network allocation IP address to the gateway and resetting a tunnel between the terminal and a network.

14. The method of claim 11, wherein the second IP address is allocated in accordance with a predetermined application.

15. A terminal for generating an internet protocol (IP) session in a mobile communication system, the terminal comprising:

a transceiver configured to transmit and receive signals; and a controller configured to:

receive an IP address of a node corresponding to an application executed by a terminal and a first IP address of a gateway corresponding to the node, generate a tunnel with the gateway based on the first IP address of the gateway, receive a second IP address, which is allocated based on the node by gateway for communicating with the node, from the gateway, generating an IP session with the node based on the second IP address and the IP address of a node IP, and control the transceiver to transmit and receive a packet of the application through the IP session.

16. The terminal of claim 15, wherein the gateway is located within a predetermined distance from the node.

17. The terminal of claim 15, wherein the second IP address by the gateway is allocated in accordance with the application executed by the terminal.

18. The terminal of claim 15, wherein the controller is further configured to:
receive a target access network IP address from a target access network when the terminal moves to the target access network from an access network; and
transmit information of the target access network IP address to the gateway to reset a tunnel between the terminal and a network.

19. The terminal of claim 18, wherein, before the tunnel between the terminal and a corresponding network is reset, the controller is configured to receive traffic via an access network that the terminal previously accessed before moving to the target access network.

20. A gateway to set a data route in a mobile communication system, a corresponding gateway comprising:
a transceiver configured to transmit and receive signals; and
a controller configured to:
control, if an IP address of a node corresponding to an application executed by a terminal and a first IP address of a gateway corresponding to the node are transmitted to the terminal, the transceiver to transmit a second IP address, which is allocated based on the node by gateway for communication between the terminal with the node, to the terminal
generate a tunnel with the terminal based on the first IP address of the gateway, and
if an IP session between the terminal and the node is generated based on the second IP address and the IP address of the node, control the transceiver to transmit and receive a packet of the application through IP session,
wherein the gateway is located within a predetermined distance from the node.

21. The gateway of claim 20, wherein the controller is further configured to allocate the second IP address to each terminal that accesses the node.

22. The gateway of claim 20, wherein, when an access network that the terminal accesses is changed, the controller is configured to receive, from the terminal, information on a target access network allocation IP address that a changed target access network allocates to the terminal.

23. The gateway of claim 20, wherein the controller is further configured to:
control the transceiver to transmit, an authentication server, an authorization request message to request an authentication of the terminal; and
transmit the second IP address to the terminal when an authorization result message is received from the authentication server.

24. A tunneling method of a local gateway in a mobile communication system, the tunneling method comprising:
receiving an internet protocol (IP) address of a node corresponding to an application executed by a terminal and a first IP address of a gateway corresponding to the node;
transmitting a request message for requesting an update to the gateway based on the first IP address of the gateway and an IP address of a local gateway;
receiving a second IP address, which is allocated based on the node by gateway for communication between the terminal with the node, from the gateway corresponding to the request message;
generating a tunnel between the local gateway and the gateway based on the first IP address of the gateway;
transmitting the second IP address to the terminal; and
generating an IP session between the terminal and the node based on the second IP address and the IP address of the node.

25. The tunneling method of claim 24, further comprising, after receiving the first IP address, transmitting the received first IP address of the node to the terminal.

26. The tunneling method of claim 24, wherein the second IP address is allocated after the local gateway is authenticated.

27. A local gateway to perform tunneling in a mobile communication system, the local gateway comprising:
a transceiver configured to transmit and receive signals; and
a controller configured to,
control the transceiver to receive an internet protocol (IP) address of a node corresponding to an application executed by a terminal and a first IP address of a gateway corresponding to the node, transmit a request message for requesting an update to the gateway based on the first IP address of the gateway and an IP address of a local gateway, receive a second IP address, which is allocated based on the node by gateway for communication between the terminal with the node, from the gateway corresponding to the request message,
generate a tunnel between the local gateway and the gateway based on the first IP address of the gateway,
control the transceiver to transmit the second IP address to the terminal and
generate an IP session between the terminal and the node based on the second IP address and the IP address of the node.

28. The local gateway of claim 27, wherein the controller is further configured to control the transceiver to transmit the received first IP address of the node to the terminal.

29. The local gateway of claim 27, wherein the second IP address is allocated after the local gateway is authenticated.

* * * * *